United States Patent [19]

Ozaki

[11] Patent Number: 5,555,556
[45] Date of Patent: Sep. 10, 1996

[54] METHOD AND APPARATUS FOR DOCUMENT SEGMENTATION BY BACKGROUND ANALYSIS

[75] Inventor: Masaharu Ozaki, Sunnyvale, Calif.

[73] Assignees: Xerox Corporation, Stamford, Conn.; Fuji Xerox Co., Ltd., Tokyo, Japan

[21] Appl. No.: 315,875

[22] Filed: Sep. 30, 1994

[51] Int. Cl.⁶ .................................................. G06K 9/34
[52] U.S. Cl. ..................... 382/173; 382/198; 382/176; 382/190; 235/375
[58] Field of Search ........................... 382/9, 21, 22, 382/8, 25, 49, 55, 24, 48, 203, 302, 173, 174, 175, 176, 190, 193, 198, 202, 203, 204; 235/375

[56] References Cited

U.S. PATENT DOCUMENTS

| | | | |
|---|---|---|---|
| 4,698,779 | 10/1987 | Holden et al. | 382/9 |
| 4,876,728 | 10/1989 | Roth | 382/21 |
| 4,887,302 | 12/1989 | Urushibata | 382/9 |
| 4,903,311 | 2/1990 | Nakamura | 382/174 |
| 4,907,285 | 3/1990 | Nakano et al. | 382/176 |
| 5,046,114 | 9/1991 | Zobel | 382/9 |
| 5,185,813 | 2/1993 | Tsujimoto | 382/180 |
| 5,201,011 | 4/1993 | Bloomberg et al. | 382/175 |
| 5,272,764 | 12/1993 | Bloomberg et al. | 382/9 |
| 5,335,298 | 8/1994 | Hevenor et al. | 382/9 |
| 5,425,110 | 6/1995 | Spitz | 382/173 |
| 5,430,808 | 7/1995 | Baird et al. | 382/176 |

OTHER PUBLICATIONS

"Page Segmentation By White Streams", T. Pavlidis et al., First International Conference on Document Analysis and Recognition, Sep. 30–Oct. 2, 1991, St. Malo, France.

"Page Segmentation and Classification", T. Pavlidis et al., CVGIP: Graphical Models and Image Processing, vol. 54, No. 6, Nov., pp. 484–496, 1992.

"Image Segmentation by Shape–Directed Covers", Baird et al., 10th Intl. Conference on Pattern Recog., Jun. 16–21, 1990, pp. 820–825.

*Primary Examiner*—Jose L. Couso
*Assistant Examiner*—Anh Hong Do
*Attorney, Agent, or Firm*—Oliff & Berridge

[57] ABSTRACT

A system for extracting document elements from a document using major white regions includes an input port for inputting a signal representing the document image, a connected component generator for generating connected components from the document image, a bounding box generator for generating a bounding box around each connected component, a major white region extractor for extracting major white regions from the document image, and a document element extractor for extracting the document elements from the document image. The method for extracting document elements comprises identifying primitive white areas laying between the bounding boxes, grouping the primitive white areas into groups, identifying the primitive white areas and groups which are major white regions, identifying closed loops of major white regions, segmenting the major white regions, locating closed loops of the segments, and identifying each portion of the document image enclosed by one of the closed loops of document segments as a document element.

18 Claims, 33 Drawing Sheets

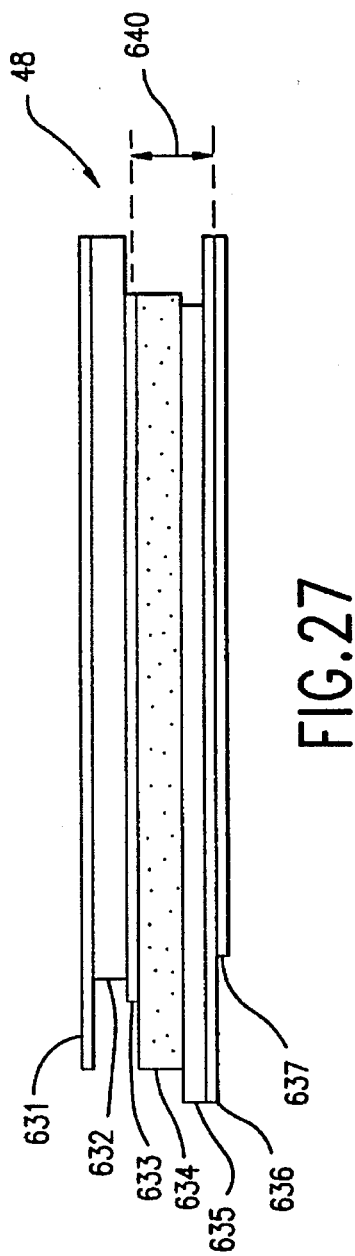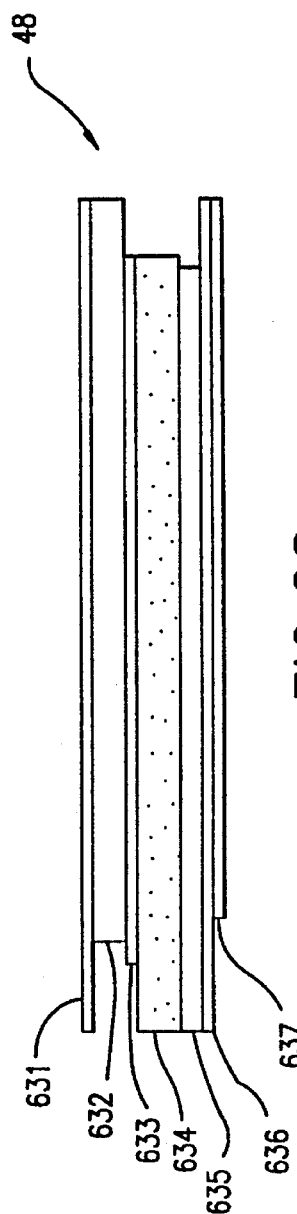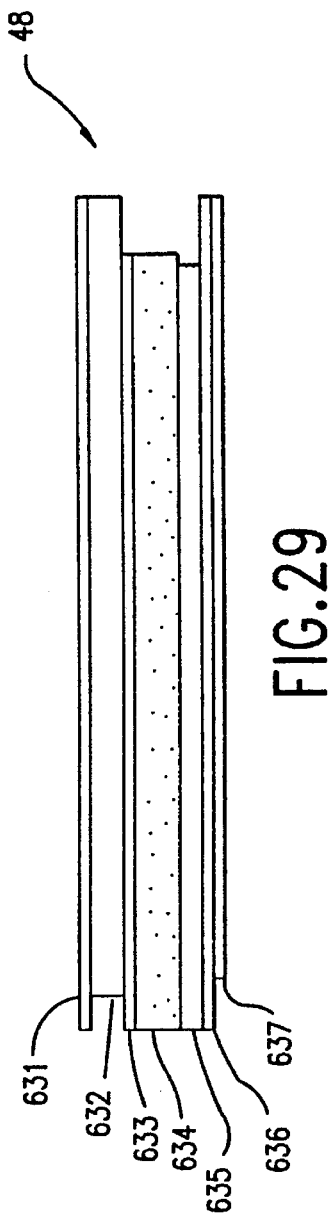

METHOD AND APPARATUS FOR DOCUMENT SEGMENTATION BY BACKGROUND ANALYSIS

BACKGROUND OF THE INVENTION

1. Field of the Invention

This invention relates to a method and apparatus for extracting major white regions and document elements from a document image.

2. Related Art

A method for segmenting text regions has been proposed in Baird et al., "Image Segmentation by Shape Directed Covers," 10th International Conference on Pattern Recognition, pp. 820–825, 16–21 Jun. 1990. The method disclosed in Baird analyzes the white space in a document image, but does not clearly disclose stopping rules for text region segmentation.

Other methods have been disclosed for segmenting document elements in a document image, but none analyze the white areas in a document image and segment document elements by extracting and analyzing major white regions. White regions are those areas of a document which contain no connected components.

SUMMARY OF THE INVENTION

This invention provides a system for identifying elements in a document image by analyzing only the white regions on the document image.

This invention also provides a document element segmenting system which can extract document elements from a document image which are not necessarily rectangularly shaped.

Using this invention, it is not necessary to analyze portions of a document image containing document elements to determine which connected components form a coherent group, i.e., a document element. An image on a document is scanned to create an electronic or digital representation of the image. Major white regions are rectangular areas of white space having a predetermined minimum size. Document elements are areas containing information such as text, graphics, etc. and are separated from one another by the major white regions. Areas containing document elements and separated from other areas by a predetermined size of white space are assumed to be separate document elements. Examples of such document elements in a document image are the title of a document, the authors, a footnote, a body of text, and so on. Once extracted, the document elements can be further processed, such as by an optical character recognition unit.

Other objects and advantages of the present invention will become apparent from the specification and claims of the present invention.

BRIEF DESCRIPTION OF THE DRAWINGS

The preferred embodiments of this invention will be described in detail with reference to the drawings, in which:

FIGS. 27–29 graphically illustrate how ends of groups of primitive white areas are trimmed and merged;

DESCRIPTION OF THE PREFERRED EMBODIMENT

Figure 1:
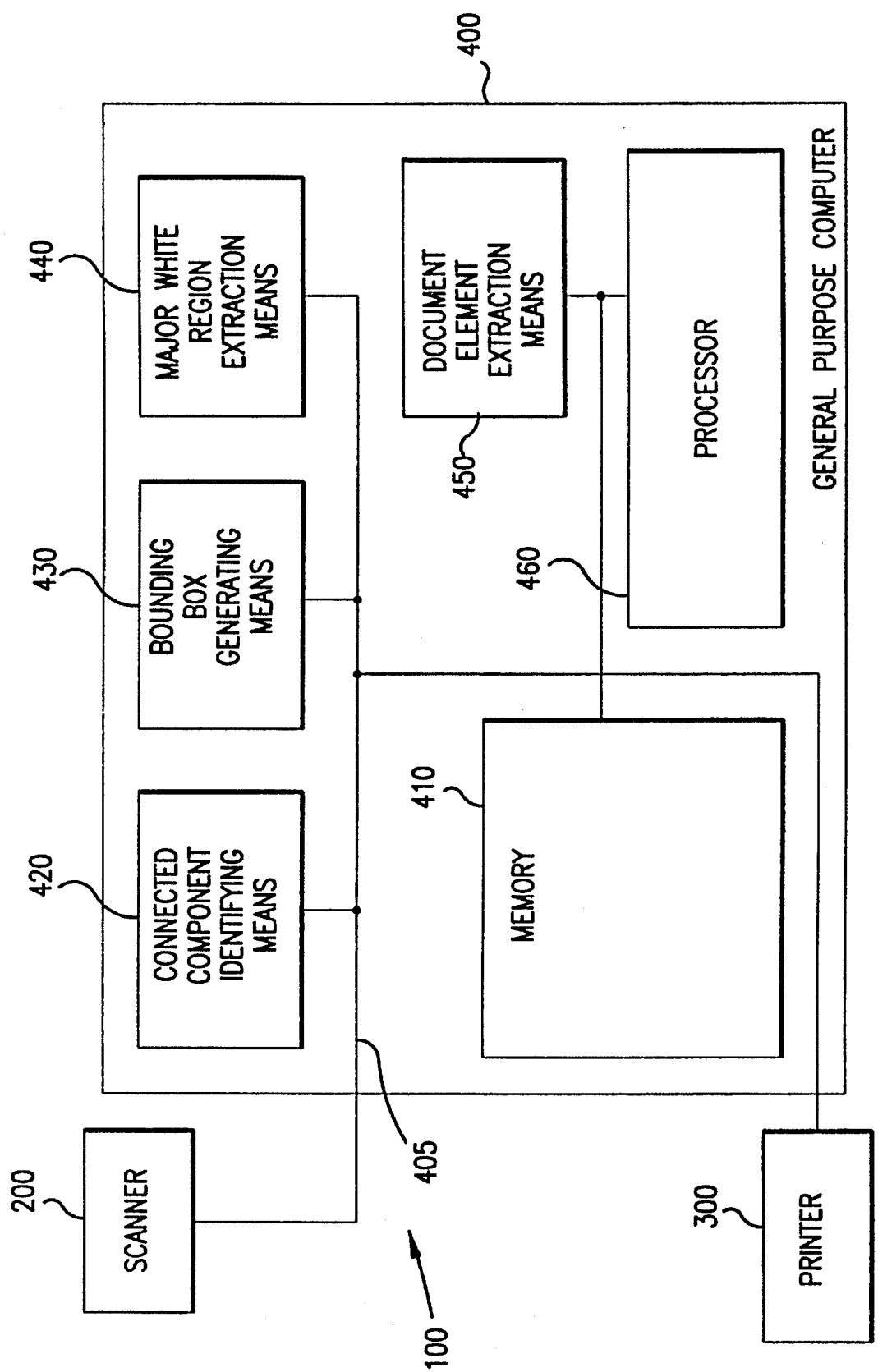
FIG. 1 is a block diagram of a preferred embodiment of the document segmentation system of this invention.

FIG. 1 shows a first preferred embodiment of a block diagram of a document element segmentation system 100. The document element segmentation system 100 described is only one of many possible embodiments for implementing the document element segmentation method explained below. Therefore, the document element segmentation system 100 set forth is exemplary only and should not be construed to limit the various types and configurations of systems which can be used to implement the document element segmentation method.

FIG. 1 shows a general purpose computer 400 having various means for segmenting a document image. In particular, the document element segmentation system 100 includes a memory 410, a connected component identifying means 420, a bounding box generating means 430, a major white region extraction means 440, a document element extraction means 450 and a processor 460, all connected together by a bus 405. A scanner 200 and a printer 300 are also connected to the bus 405. Document image data is first input into the connected component identifying means 420 by a scanner 200 or from a memory 410. The memory 410 may be located within the general purpose computer 400 or without in the form of a disk drive, CD-ROM, EPROM, and the like, as well known in the art. Likewise, the document image data from the scanner 200 may be first stored in the memory 410 before being input to the connected component identifying means 420. The document image data is input into the connected component identifying means 420 in the form of a binary image, or a plurality of bits of a digital signal, each bit representing whether a particular pixel of the document image is "on" or "off."

Figure 3:
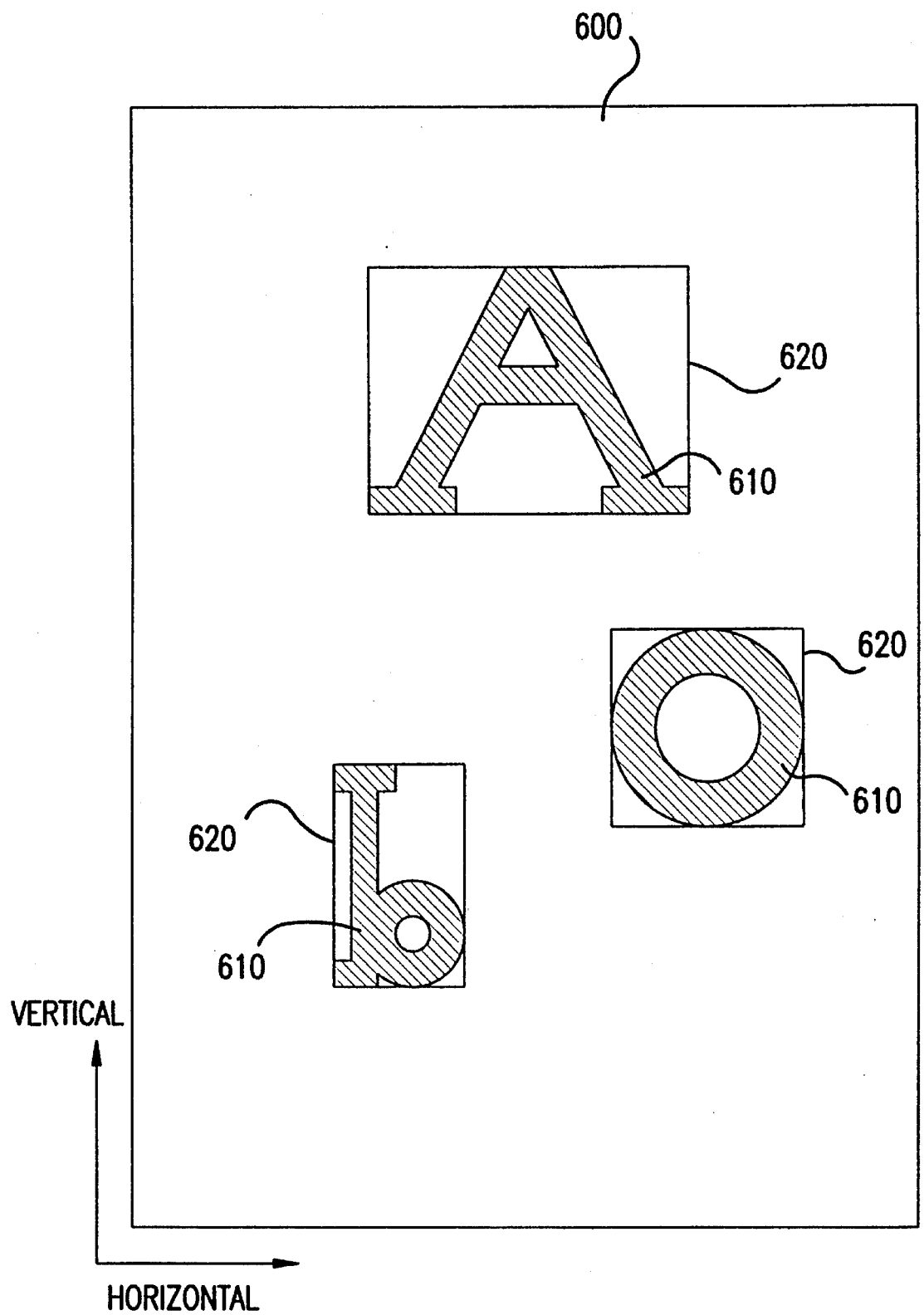
FIG. 3 shows a sample document image.

After the connected component identifying means 420 receives the document image data, the connected components identifying means 420 identifies all of the connected components in the document image. FIG. 3 shows an exemplary document image 600. The connected components 610 are found within the document image 600. Each connected component 610 comprises a series of adjacent "on" (i.e., black) pixels surrounded by "off" (i.e., white) pixels. Systems for identifying connected components 610 in document images 600 are well known in the art.

Once the connected components 610 of the document image 600 are identified, the bounding box generating means 430 generates a bounding box 620 for each connected component 610. The bounding box 620, as well known in the art, is a minimum-sized rectangular box which completely encloses the corresponding connected component 610, as shown in FIG. 3. Systems for generating bounding boxes 620 from connected components 610 are also well known in the art.

Figure 4:
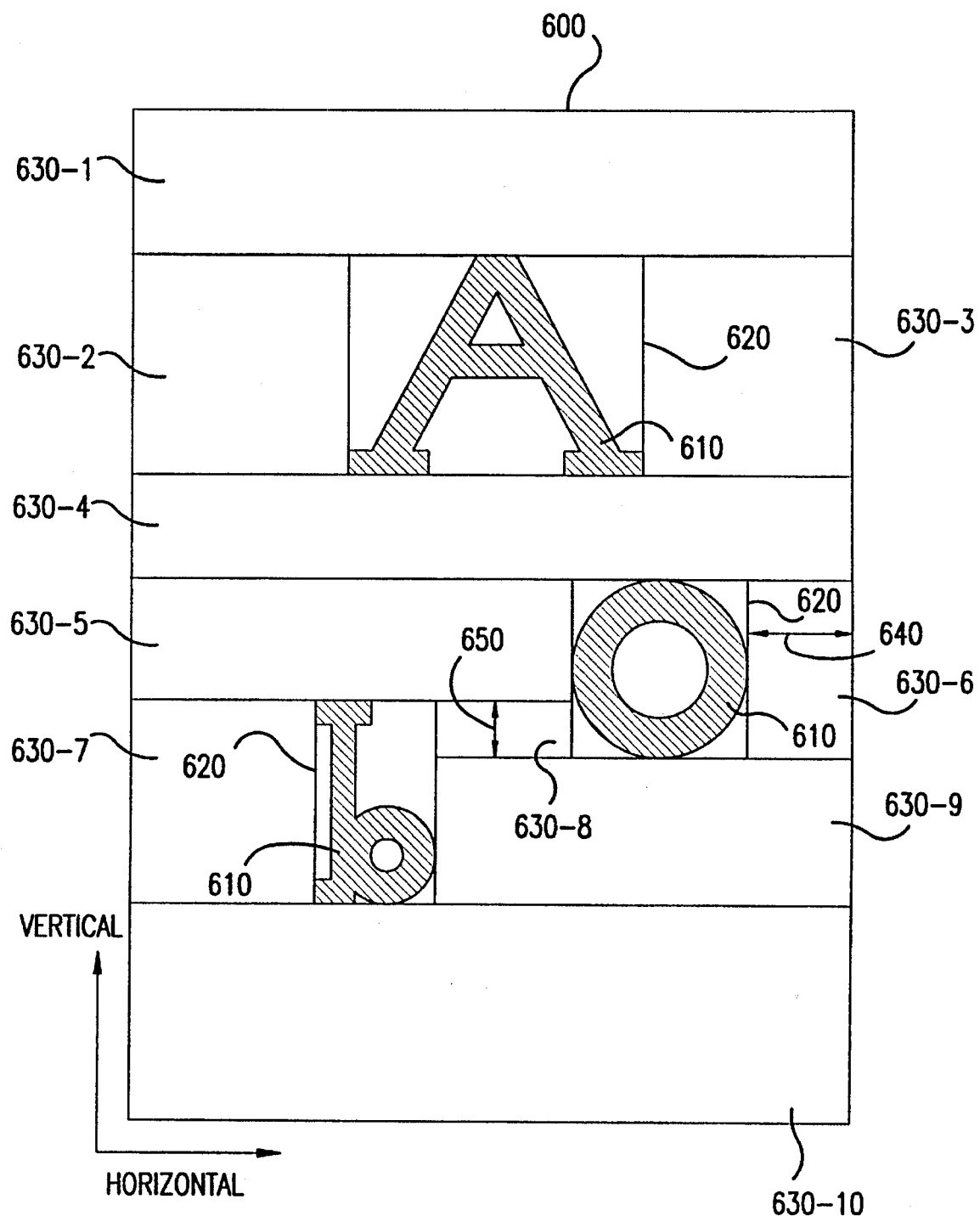
FIG. 4 shows a document image with horizontal primitive white areas extracted.
Figure 5:
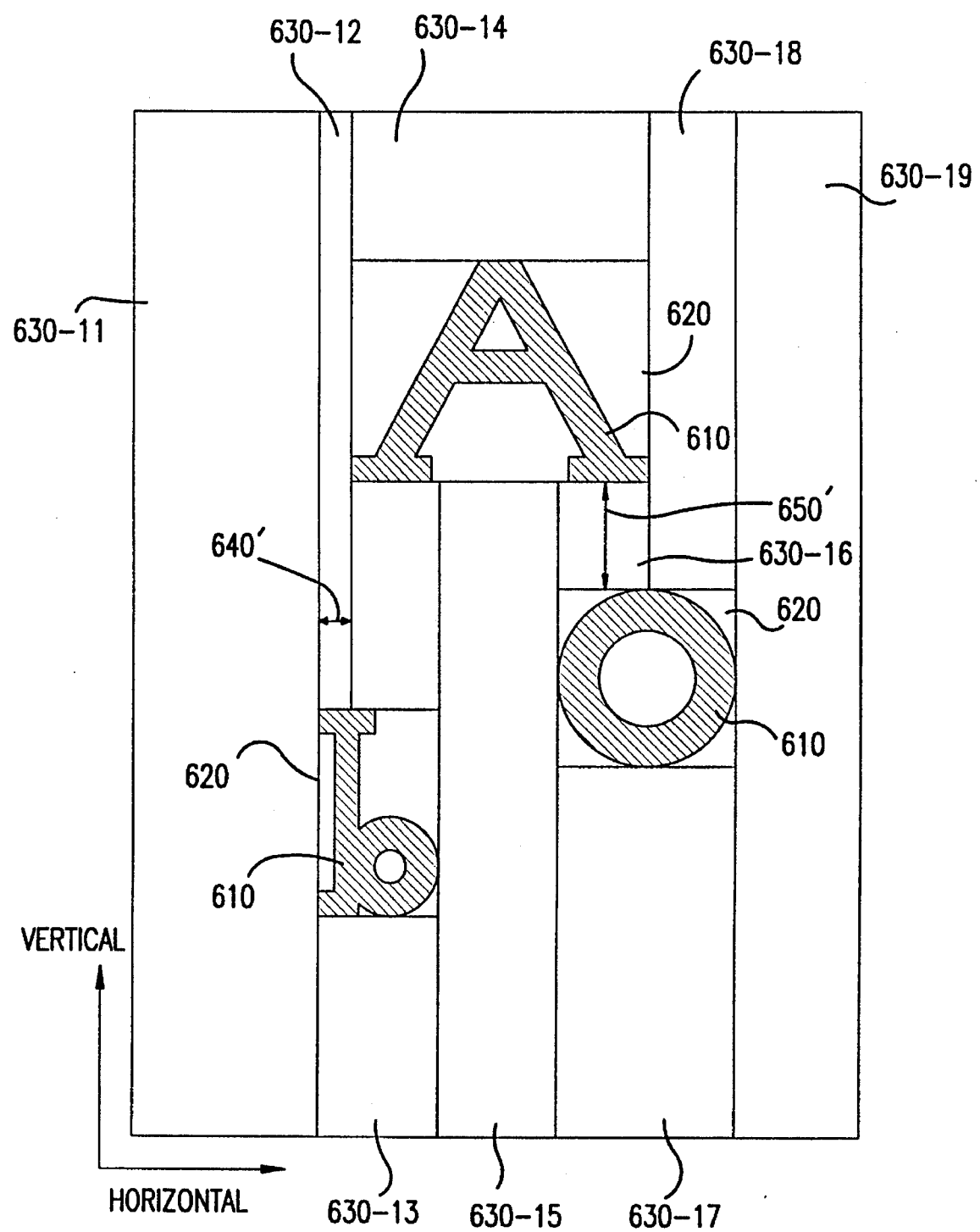
FIG. 5 shows a document image with vertical primitive white areas extracted.

The document image data with bounding box information is sent to the major white region extraction means 440, which extracts major white regions 660 in the vertical and horizontal directions of the document image 600, as shown in FIGS. 4 and 5.

Figure 2:
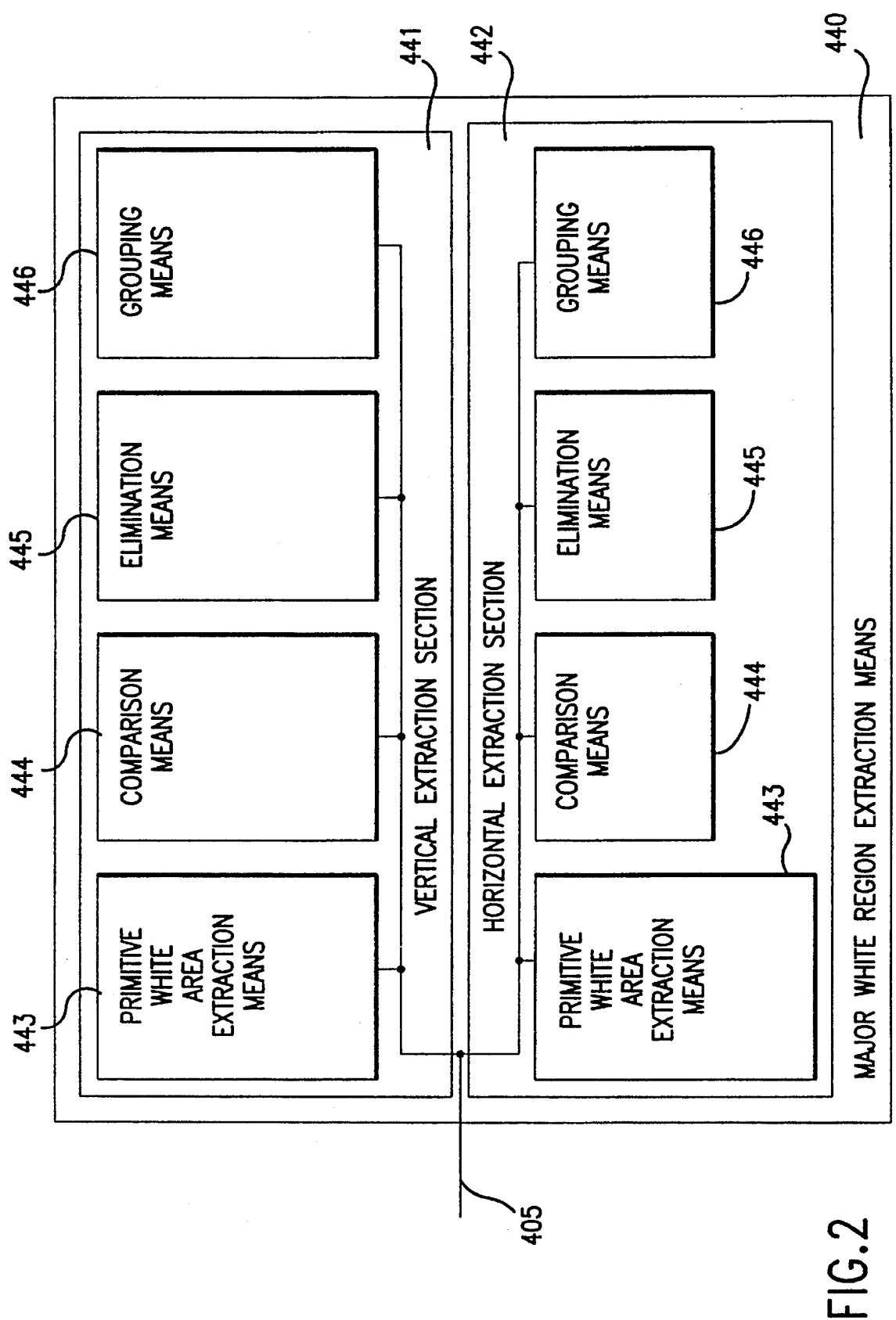
FIG. 2 is a block diagram of a preferred embodiment of the major white region extraction means.

In a preferred embodiment of the document element segmentation system 100, the major white region extraction means 440 is divided into two sections, a vertical extraction section 441 and a horizontal extraction section 442, each connected to the bus 405, as shown in FIG. 2. Both the vertical extraction section 441 and the horizontal extraction section 442 contain a primitive white area extraction means 443, a comparison means 444, an elimination means 445 and a grouping means 446, each connected to the bus 405, and operate in a similar fashion. As shown in FIG. 4, the horizontal extraction section 442 first extracts primitive white areas 630-1 to 630-10 and assembles major white regions 660 in the horizontal direction. Likewise, as shown in FIG. 5, the vertical extraction section 441 first extracts primitive white areas 630-11 to 630-19 and assembles major white regions 660 in the vertical direction.

Assembling horizontal major white regions 660 is done by grouping and merging adjacent ones of the horizontal primitive white areas 630-1 to 630-10 into single horizontal grouped primitive white areas 630' according to specific rules. Likewise, assembling vertical major white regions 660 is done by grouping and merging adjacent ones of the vertical primitive white areas 630-11 to 630-19 into single vertical grouped primitive white areas 630'. After the grouping and merging of the vertical and horizontal primitive white areas is complete, horizontal primitive white areas 630 and 630' having a width greater than a width threshold 640 and a height greater than a height threshold 650 and vertical primitive white areas 630 and 630' having a height greater than a height threshold 650' and a width greater than a width threshold 640' are identified as the major white regions 660. It should be appreciated that the height and width thresholds 640, 650, 640' and 650' shown in FIGS. 4 and 5 are not shown to scale.

Figure 6B:
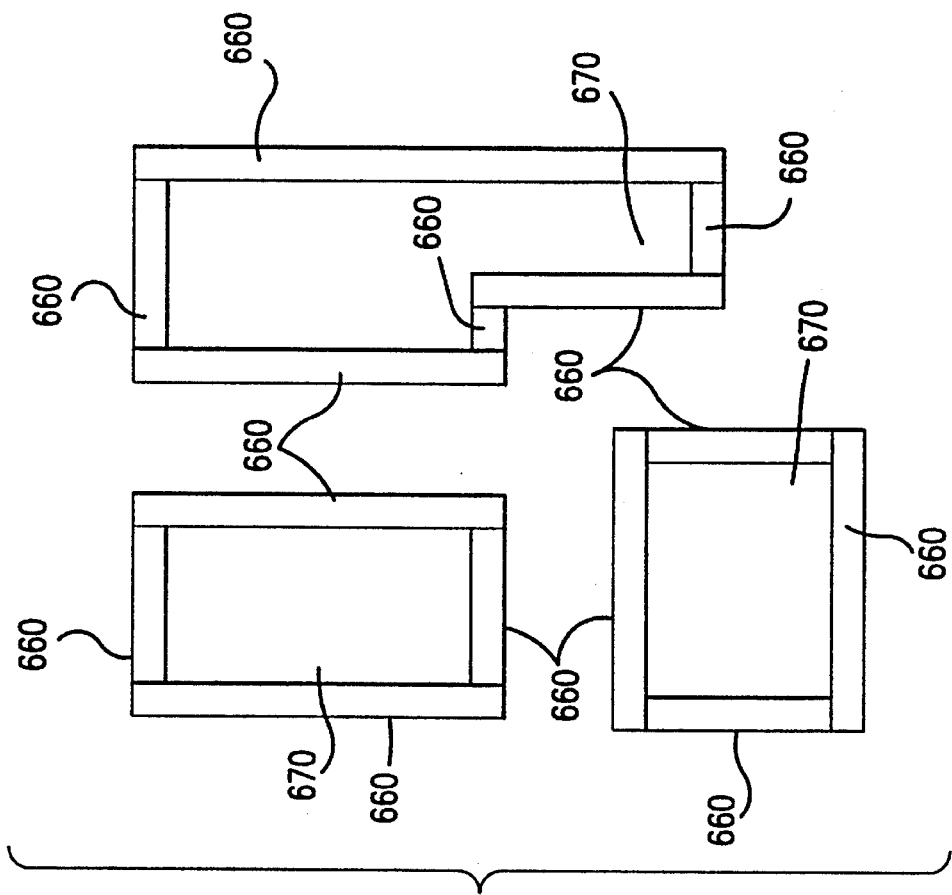
FIG. 6B shows the document elements segmented and extracted.
Figure 6A:
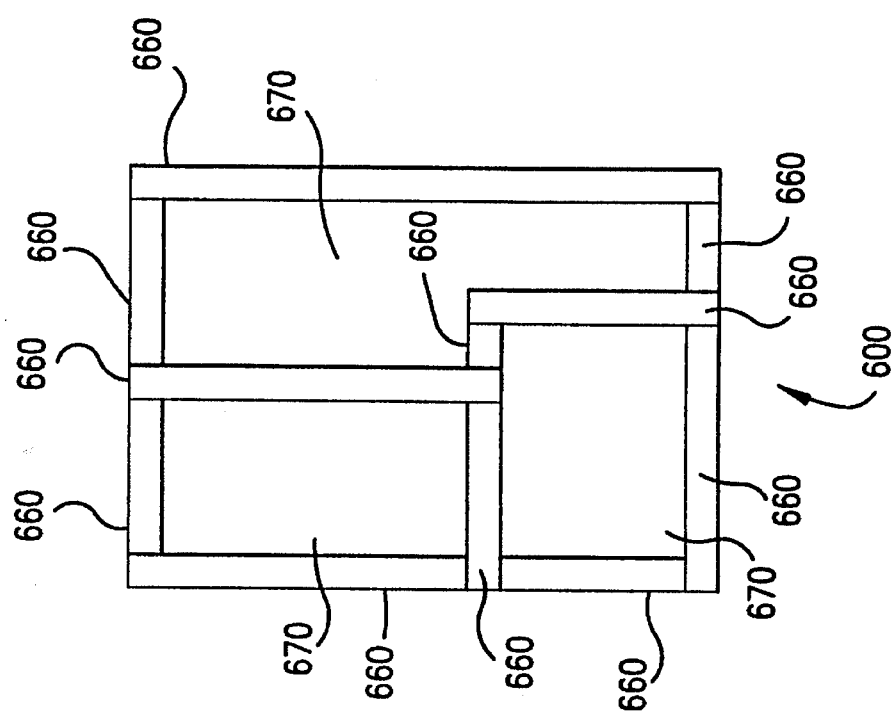
FIG. 6A shows a document image with major white regions extracted.

Once the vertical and horizontal major white regions 660 in the document image 600 are extracted, the document element extraction means 450 uses the major white regions 660 to segment the document elements 670 within the document image 600, as shown in FIGS. 6A and 6B. The document elements 670 are extracted by tracing the major white regions 660 to find closed loops. A closed loop which has no other closed loops inside of it segments a document element 670 from the rest of the document image 600, as shown in FIG. 6B.

In FIG. 6B, there are three closed loops which do not contain other closed loops. This means that there are three segmented document elements 670 contained in the document image 600. It should be noted that document elements 670 need not be rectangular in shape, and may have more than four sides.

The segmented document elements 670 are output to a variety of system components including the memory 410, a printer 300, and a processor 460. How the segmented document elements 670 are output depends upon what is to be done with the segmented document elements 670. The document elements 670 may be stored in the memory 410 or printed on a printer 300. The segmented document elements 670 may be further processed by a processor 460, for example, to perform an optical character recognition process upon the connected components contained within each segmented document element 670.

The document element extraction means 450 then outputs the segmented document elements 670 or information relating to the segmented document elements 670 to a printer 300, a memory 410, or a processor 460 for further processing.

Figure 7:
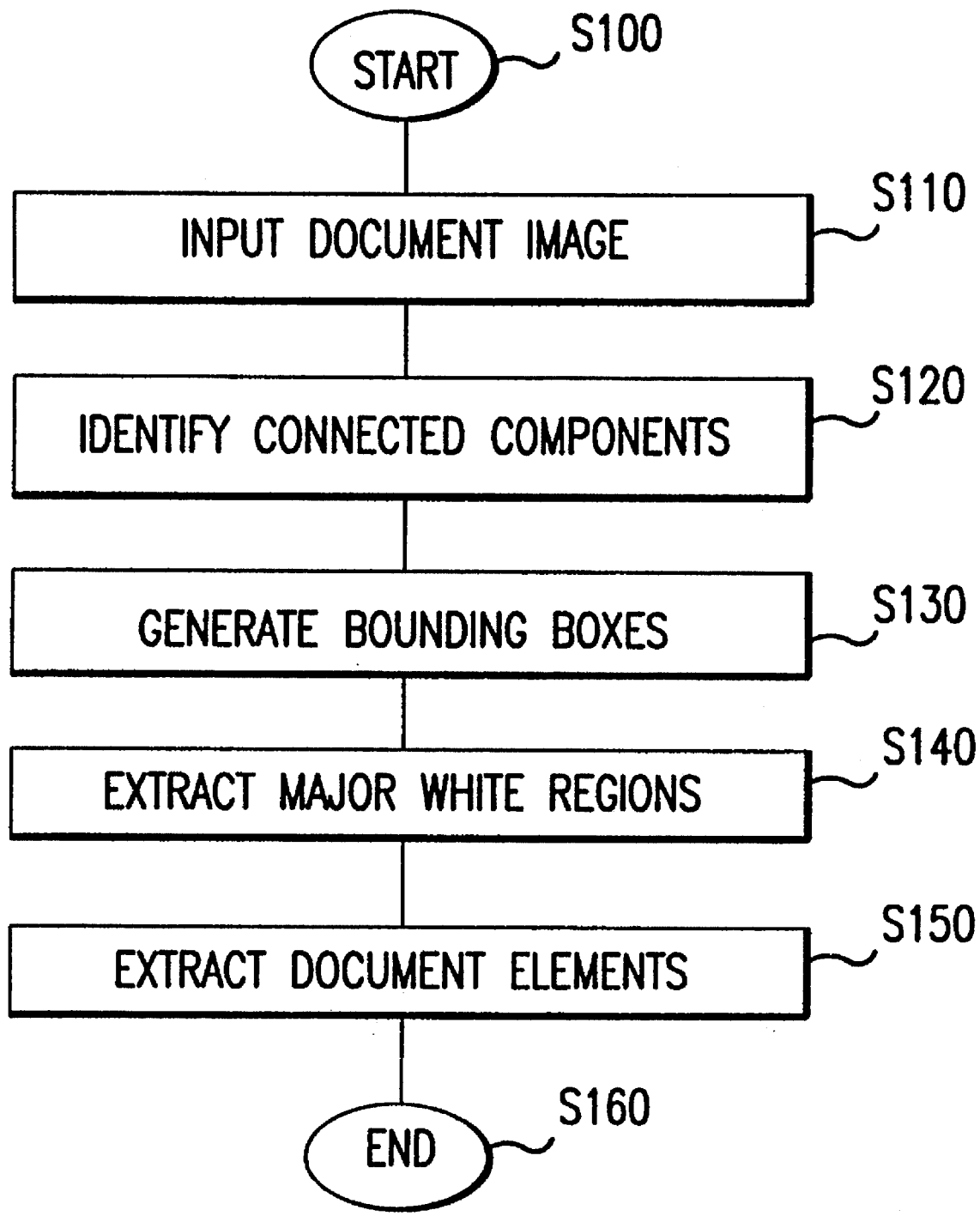
FIG. 7 is a flow chart of one embodiment of the method for extracting major white regions and document elements.

FIG. 7 outlines one preferred embodiment of the method for extracting the major white regions 660 and segmenting the document elements 670. First, after starting in step S100, in step S110 the document image 600 is input. The input document image 600 has a number of document elements 670. In step S120, the connected components 610 of the document image 600 are identified. Next, in step S130, a bounding box 620 is generated for each of the connected components 610 identified in step S120. In step S140, the major white regions 660 are extracted. In step S150, the document elements 670, segmented by the major white regions 660, are extracted. Then, in step S160, the process ends.

Figure 8:
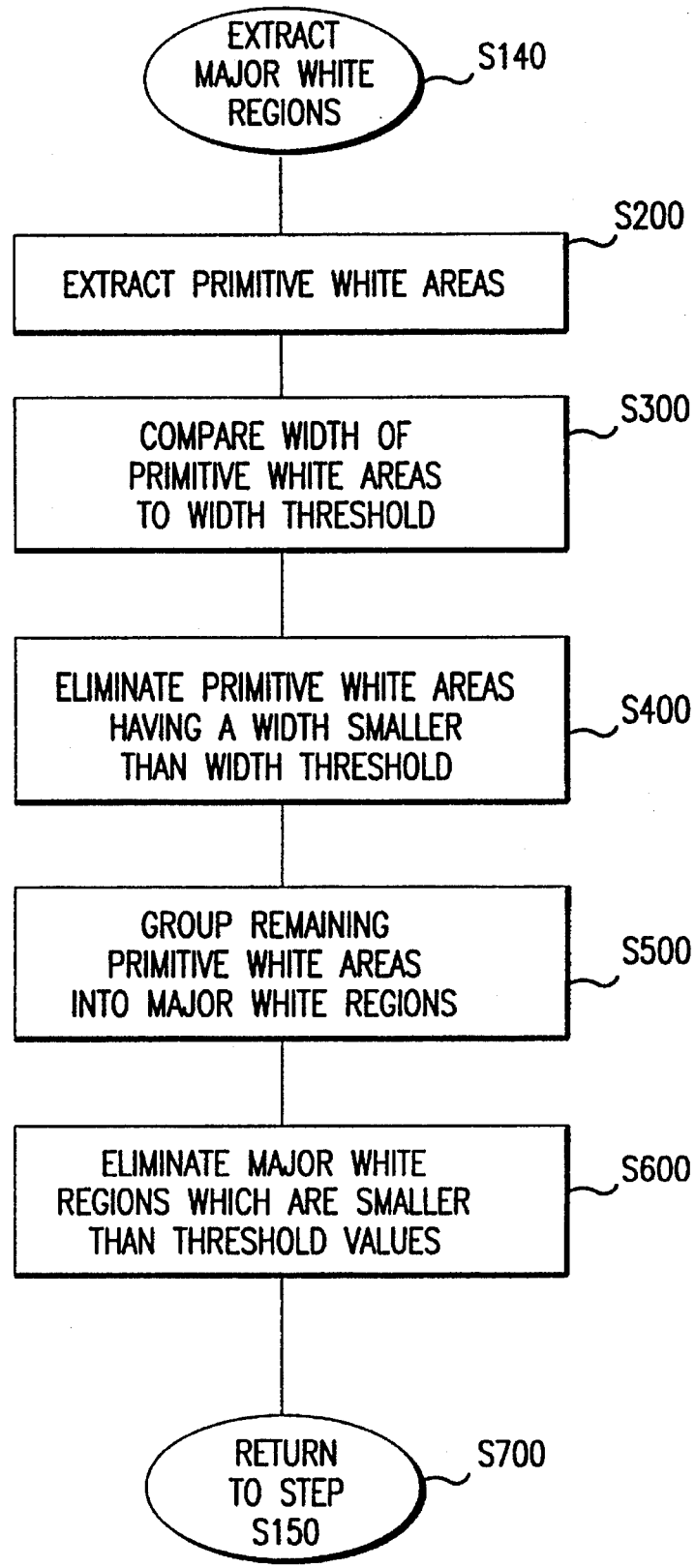
FIG. 8 is a flow chart of one embodiment of the method for extracting major white regions.

FIG. 8 outlines a first preferred embodiment of the major white region extraction process of step S140. In step S200, the primitive white areas 630 are extracted. As shown in FIG. 4, the primitive white areas 630 are rectangular-shaped areas of white space between the bounding boxes 620. Next, in step S300, the height and width of each of the horizontal primitive white areas 630 is compared to a width threshold 640', a height threshold 650, and the height and width of each vertical primitive white areas 660 is compared to a height threshold 650' and a width threshold 640'. The width threshold 640 in the horizontal direction is preferably set to one-third of the length of the document image 600 in the horizontal direction. The height threshold 650 in the horizontal direction is set to a value greater than the line spacing of the text in the document image. The height threshold 650' in the vertical direction is preferably set to one-third of the length of the document image 600 in the vertical direction. The width threshold 640' in the vertical direction is set to a value greater than the line spacing of the text in the document image.

In step S400, the horizontal primitive white areas 630 having widths smaller than the width 640 threshold and the vertical white areas 630 having heights smaller than the height threshold 650' are eliminated. In step S500, the remaining primitive white areas 630 are grouped and the major white regions 660 are established. Finally, in step S600, those major white regions 660 which have at least one of their vertical or horizontal extents which is less than the corresponding vertical or horizontal threshold are eliminated. Alternately, only those major white regions 660 which have both their vertical and horizontal extents less than the corresponding thresholds are eliminated. Then, in step S700, control returns to step S150.

Figure 9A:
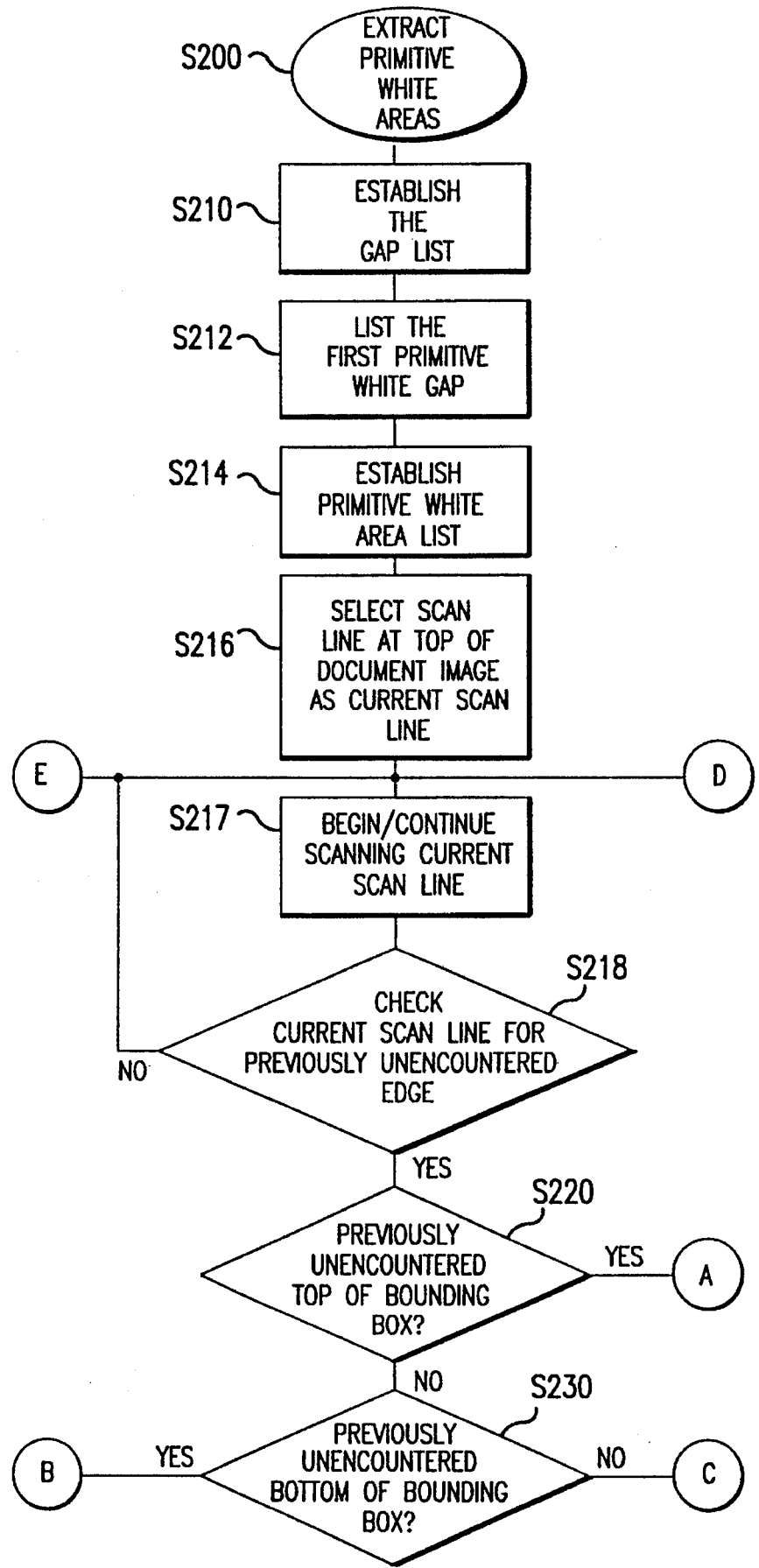
FIGS. 9A–B are a flow chart of one embodiment of the method for extracting primitive white areas.
Figure 9B:
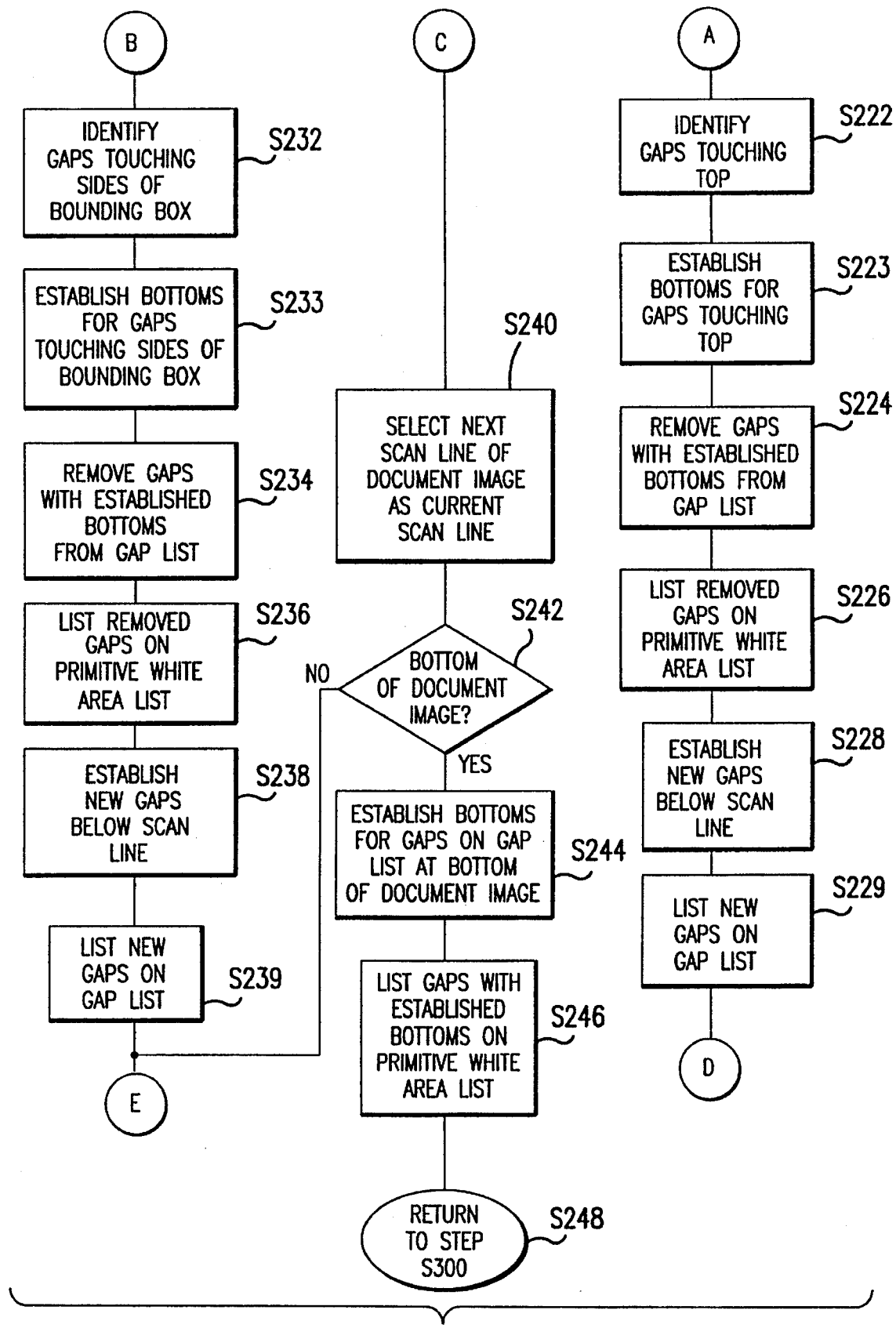

FIGS. 9A–B outline a first preferred embodiment of the horizontal primitive white area extraction process of step S200. The vertical primitive white area extraction process is identical to the horizontal white area extraction process, except that the left and right edges are used instead of the top and bottom edges. In step S210, a gap list is established. In step S212, the gap list is set to initially contain a first primitive white gap 680. The primitive white gaps 680 are potential primitive white areas 630 which have a top and left and right sides established, but do not yet have a bottom established. The first primitive white gap 680 initially listed on the gap list has a top at the top of the document image 600, a left side at the far left side of the document image 600, and a right side at the far right side of the document image 600. In step S214, a primitive white area list is established as initially empty.

In step S216, the current scanline 1000 is located at the top of the document image 600. In step S217, scanning along the current scanline 1000 is begun from left to right. In step S218, the scanline 1000 is checked to determine if an edge of a bounding box or the edge of the document image 600 has been encountered. If an edge has been encountered, control continues to step S220. Otherwise, control returns to step S217 for further scanning of the current scanline 1000.

Figure 10:
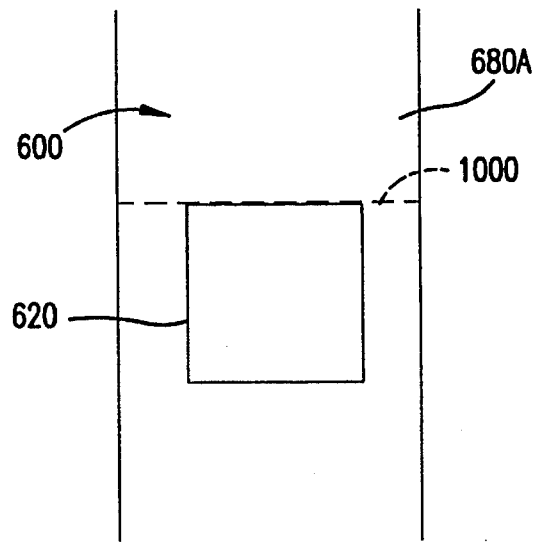
FIGS. 10–13 graphically illustrate various ways primitive white areas are formed and primitive white gaps are located when the top of a bounding box is encountered in the scanline.

In step S220, if the edge encountered is a previously unencountered top of one of the bounding boxes 620, control jumps to step S222. In step S222, as shown in FIG. 10, the primitive white gap 680-A in the gap list which touches the top edge of the bounding box 620 is identified. There may be one or more such primitive white gaps 680-A. In step S223, a bottom for each primitive white gap 680-A which touches the top edge of the bounding box 620 is established. In step S224, the primitive white gaps 680-A are removed from the gap list. In step S226, the primitive white gaps 680-A removed from the gap list are placed on the primitive white gap list as primitive white areas 630.

Figure 11:
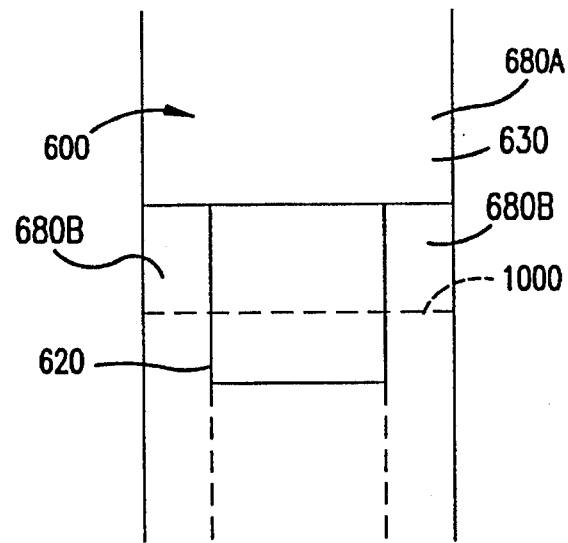
Figure 12:
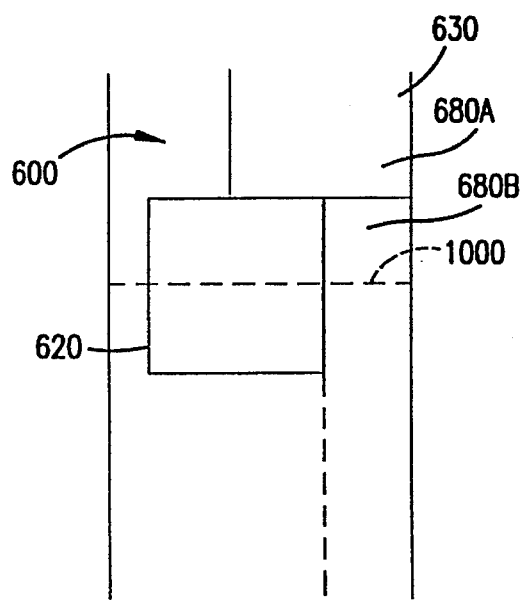
Figure 13:
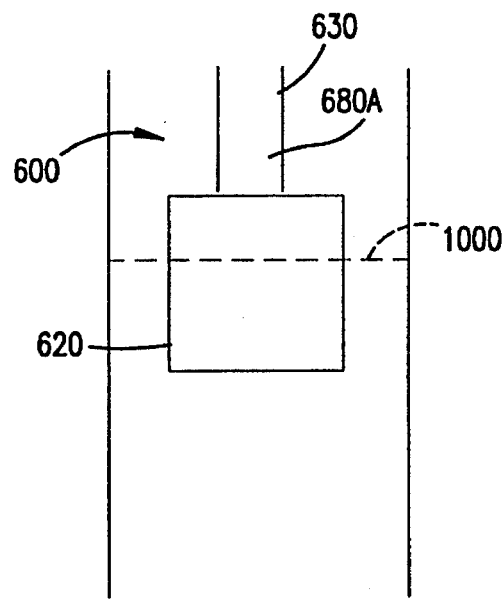

Next, as shown in FIG. 11, in step S228, the new primitive white gaps 680-B having a top located along the same line as the top edge of the bounding box 620 and a side adjacent to the side of the bounding box 620 are established, as shown in FIG. 11. As shown in FIGS. 12 and 13, the top edge of the previously unencountered bounding box may intersect one or both of the vertical edges of the primitive white gaps 680-A. In this case, there will be none, or only one, new primitive white gap 680-B added to the gap list. In step S229, the new primitive white gaps 680-B are listed on the gap list. Then, control returns to step S217 for further scanning along the current scanline 1000.

Scanning the current scanline 1000 is continued in step S217. If another previously unencountered top edge of one of the bounding boxes 620 is encountered, steps S222–S229 described above are repeated.

If, in step S220, the encountered edge is not another previously unencountered top edge of one of the bounding boxes 620, control continues to step S230. In step S230, if the edge encountered is a previously unencountered bottom edge of a bounding box 620, control continues to step S232. In step S232, the primitive white gaps 680-B which touch the sides of the bounding box 620 whose bottom edge has been located are identified. Generally, there will be at least two such gaps 680-B, although there could be fewer or more. Rarely, if one side of the bounding box 620 is flush with an edge of the document image 660 or another bounding box 620, there will only be one gap 680-B. In step S233, a bottom is established for each primitive white gap 680-B touching a side of the bounding box 620. In step S234, those primitive white gaps 680-B having newly established bottom edges are removed from the gap list. In step S236, the primitive white gaps 680-B are placed on the primitive white area list as primitive white areas 630. In step S238, new primitive white gaps 680-C having a top along the same line as the bottom edge of the newly encountered bounding box 620 and left and/or right sides established at sides of other bounding boxes 620 or at the far left and/or right sides of the document image 600 are established. In step S239, the newly established primitive white gaps 680-C are listed on the gap list. Then, control returns to step S217 for further scanning along the current scanline 1000.

FIGS. 12–16 show a few of the possibilities which may occur when the top or the bottom of the bounding box 620 is encountered in the scanline 1000. FIG. 12 shows a primitive white gap 680-A touching the top of the bounding box 620 and extending only to the right of the right side of the bounding box 620. A bottom for the primitive white gap 680-A is established at the top of the bounding box 620 and a new primitive white gap 680-B is established to the right of the bounding box 620 having a top along the same line as the top of the bounding box 620. FIG. 13 shows a primitive white gap 680-A touching the top edge of a bounding box 620, but not extending to either the left or right sides of the bounding box 620. A bottom for the primitive white gap 680-A is established at the top of the bounding box 620 but no new primitive white gaps 680-B are established.

Figure 14:
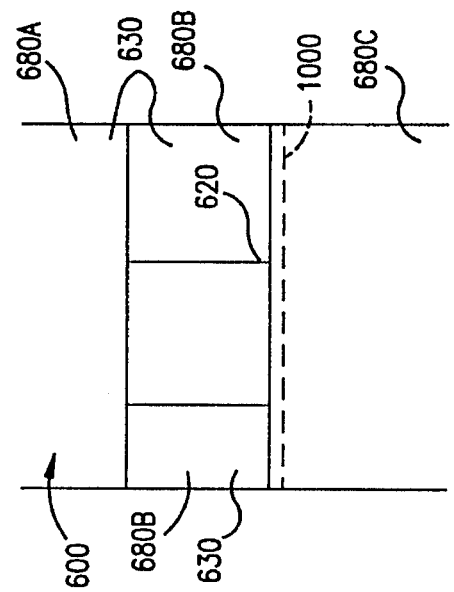

FIG. 14 shows the bottom of a bounding box 620 being encountered in the scanline 1000. Primitive white gaps 680-B are located on either side of the bounding box 620 and touch the sides of the bounding box 620. Therefore, bottoms are established for the primite white gaps 680-B on either side of the bounding box 620 and the primitive white gaps 680-B having newly established bottoms are removed from the gap list and listed on the primitive white area list as primitive white areas. A new primitive white gap 680-C is established below the bounding box 620 bottom, having a top located along the same line as the bottom of the bounding box 620. This new primitive white gap 680-C is listed on the gap list.

Figure 15:
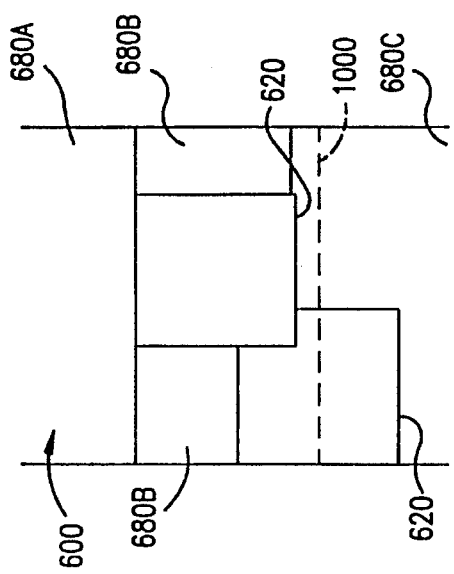

FIG. 15 shows a bottom of a bounding box 620 being encountered in the scanline 1000, with a primitive white gap 680-B located to the right of the bounding box 620. A bottom for the primitive white gap 680-B located on the right of the bounding box 620 is established along the same line as the bottom of the bounding box 620, establishing a new primitive white area. A new primitive white gap 680-C having a top along the same line as the bottom of the bounding box 620, a left side located along the right side of a second bounding box 620 and a right side located along the far right edge of the document image 600 is established.

Figure 16:
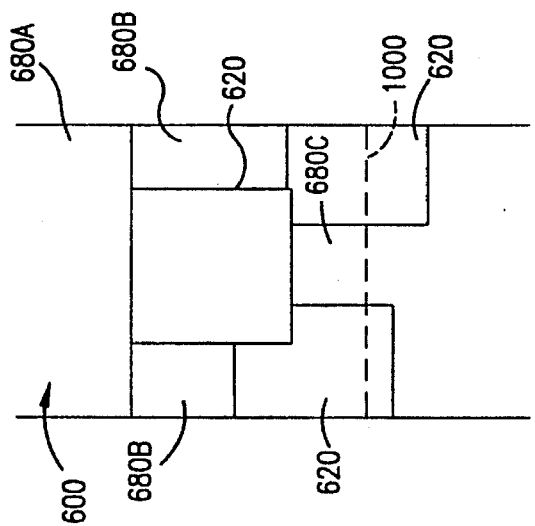
FIGS. 14–16 graphically illustrate various ways primitive white areas are formed and primitive white gaps are located when the bottom of a bounding box is encountered in the scanline.

FIG. 16 shows the scanline 1000 encountering a bottom of a bounding box 620, with no primitive white gaps 680-B touching the sides of the bounding box 620. A new primitive white gap 680-C is established having a top at the bottom of the bounding box 620, a left side located along the right side of a second bounding box 620 and a right side located along the left side of a third bounding box 620.

Scanning in the scanline 1000 is continued until the right edge of the document image is reached. If the edge detected in step S218 is not a top edge or a bottom edge, control jumps through steps S220 and S230 to step S240. In step S240, the next scanline down the document image becomes the current scanline 1000. Control then continues to step S242, where the current scanline 1000 is checked to see if it coincides with the last scanline of the document image. If so, control continues to step S244, where bottoms for all of the primitive white gaps 680A, 680B, and 680-C remaining on the gap list are established at the bottom of the document image 600. In step S246, new primitive white areas 630 are listed on the primitive white area list corresponding to the primitive white gaps 680 having bottoms at the bottom of the document image 600. Then, in step S248, control returns to step S300.

Figure 17A:
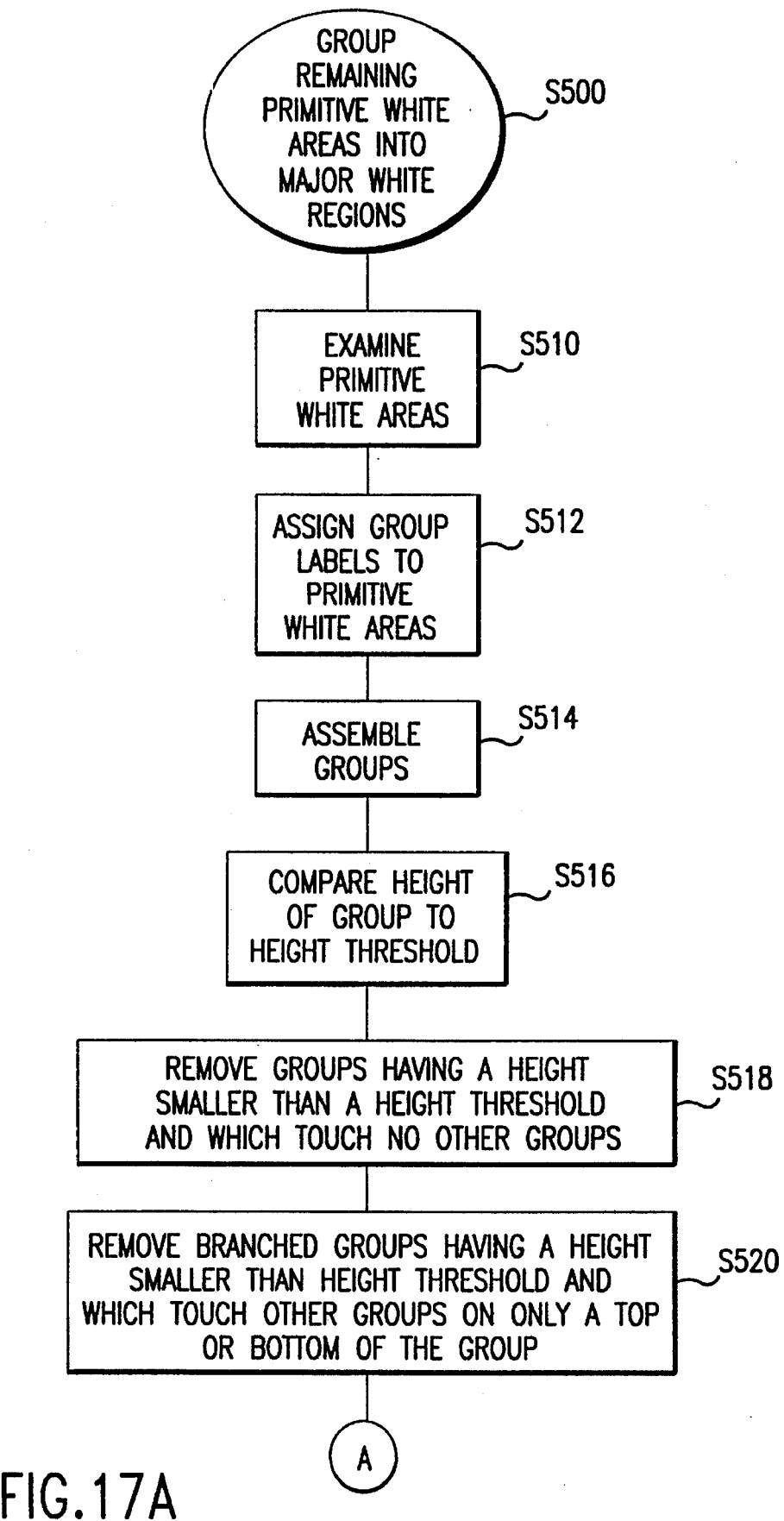
FIGS. 17A–B are a flow chart of one embodiment of the method for grouping remaining primitive white areas into major white regions.
Figure 17B:
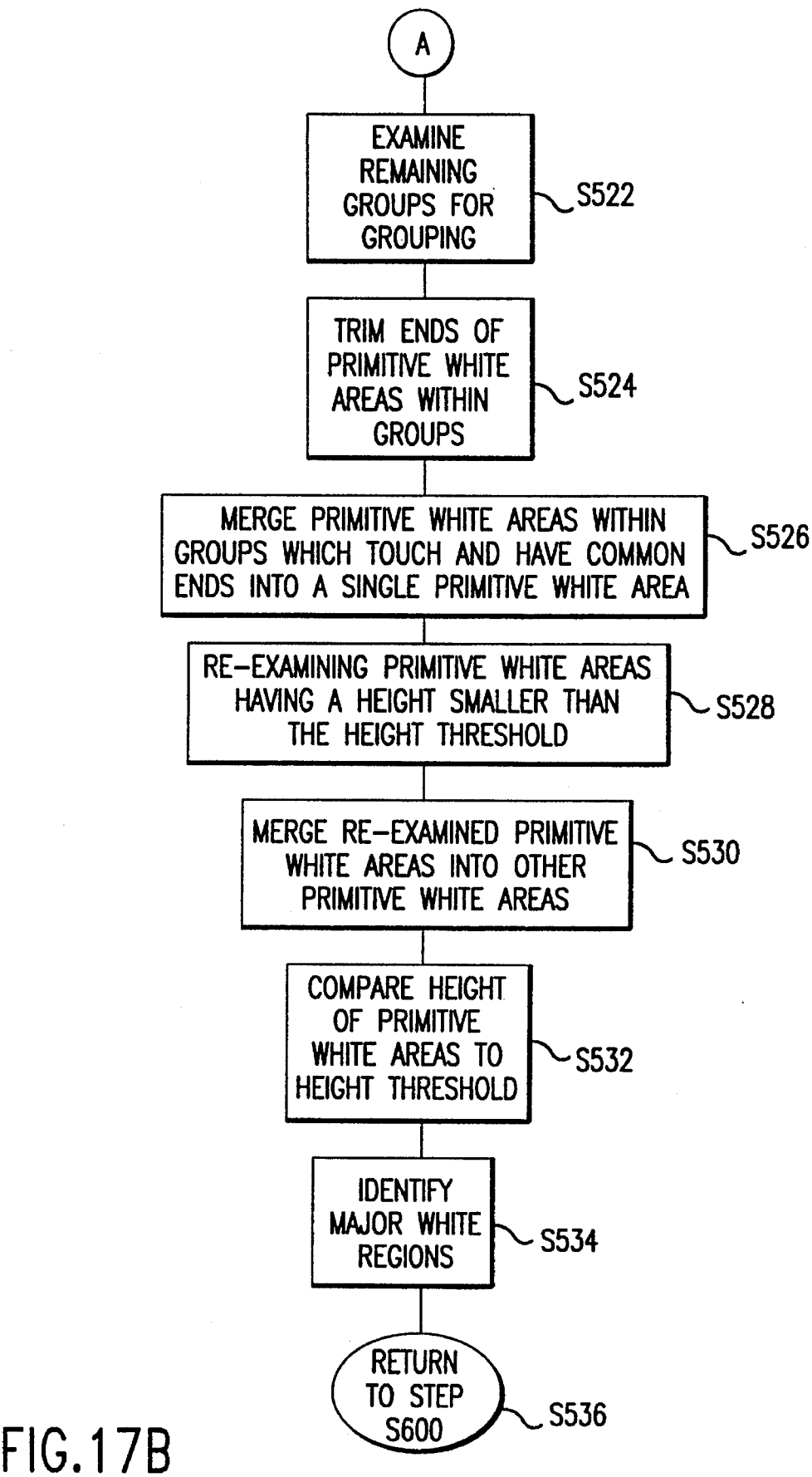

FIGS. 17A–B outline one preferred embodiment for the process for grouping the primitive white areas into major white areas of step S500.

Figure 18:
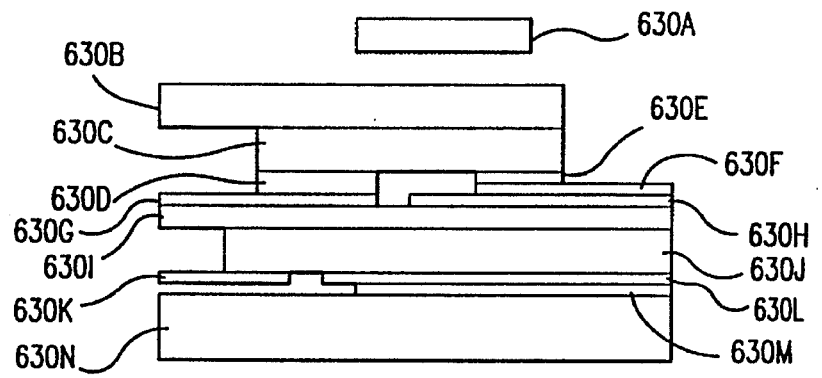
FIGS. 18–23 graphically illustrate various ways primitive white areas are labeled, removed and grouped.
Figure 19:
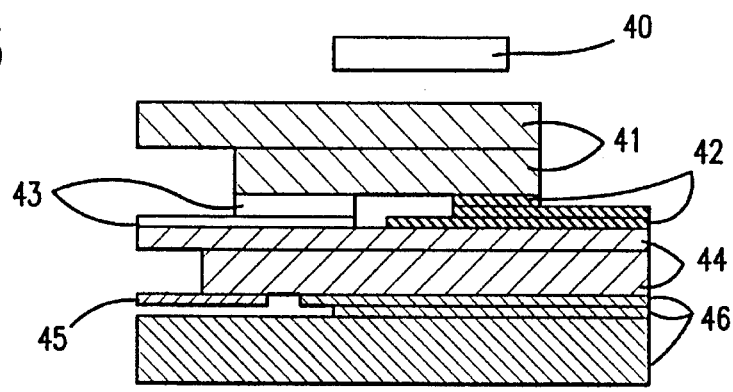

First, in step S510, each of the primitive white areas 630, which remain after eliminating the too-small primitive white areas in step S400, is examined. FIG. 18 shows a number of primitive white areas 630A to 630N remaining after all of the too-small primitive white areas are removed. In step S512, group labels are appended to each group of one or more of the primitive white areas 630A–630N. The primitive white areas 630A–630N are grouped so that primitive white areas which uniquely touch each other are in the same group. As shown in FIG. 19, the primitive white areas 630A–630N are grouped into six distinct groups 40–46.

Figure 21:
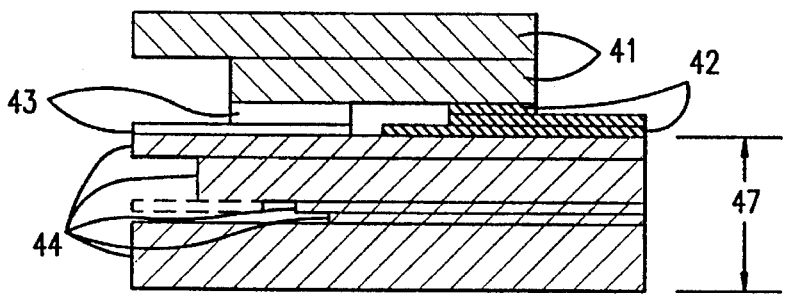

In step S514, after the group labels are assigned to the primitive white areas 630A–630N, groups of primitive white areas 630 having the same group label are gathered into a single group 41–46, as shown in FIG. 19. Next, in step S516, for horizontal groups, the height 650 of each horizonal group 40–46 is compared to the height threshold 650. The height 47 of a group is the size of the group in a direction perpendicular to the direction of each primitive white area's 630 width, as shown in FIG. 21. Thus, for vertical groups the "height" 47 of a group is the size of the group in the horizontal direction and the height 47 of the vertical group is compared to the width threshold 640' In a preferred embodiment of the invention, the height threshold 650 or 640' is set to a value greater than the line spacing of the text in the document image 600.

Figure 20:
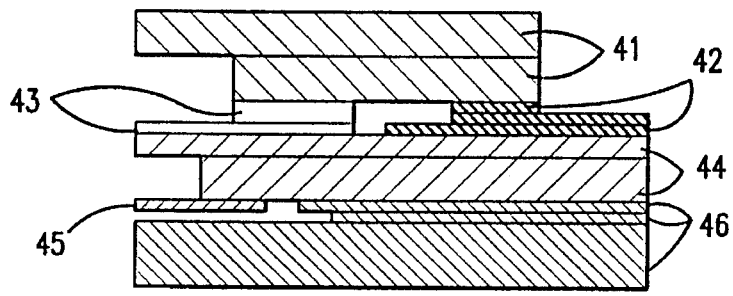

In step S518, a group which has a height 47 smaller than the height threshold 650 or 640' and touches no other group, is removed. This is the case with group 40 of FIG. 19. In step S520, branched groups which have a height 650 or 640' smaller than the height threshold 47 and touch other groups only on one surface (i.e., only on either the bottom of the group or the top of the group) are removed. This is the case for group 45 of FIG. 20. In step S522, after removing isolated and branched groups which are smaller than the height threshold 650 or 640', the remaining groups 41–44 and 46 are examined to determine if the number of remaining groups can be reduced by combining two or more of the groups 41–44 and 46.

In step S524, the ends of primitive white areas which have a height smaller than the height threshold are trimmed off. This is shown in FIGS. 27–29 and described in greater detail below.

Figure 22:
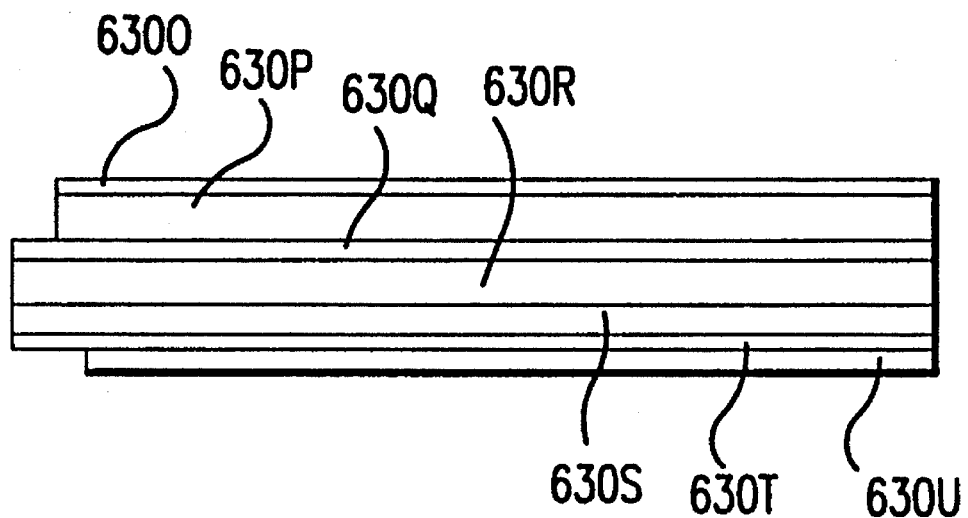
Figure 23:
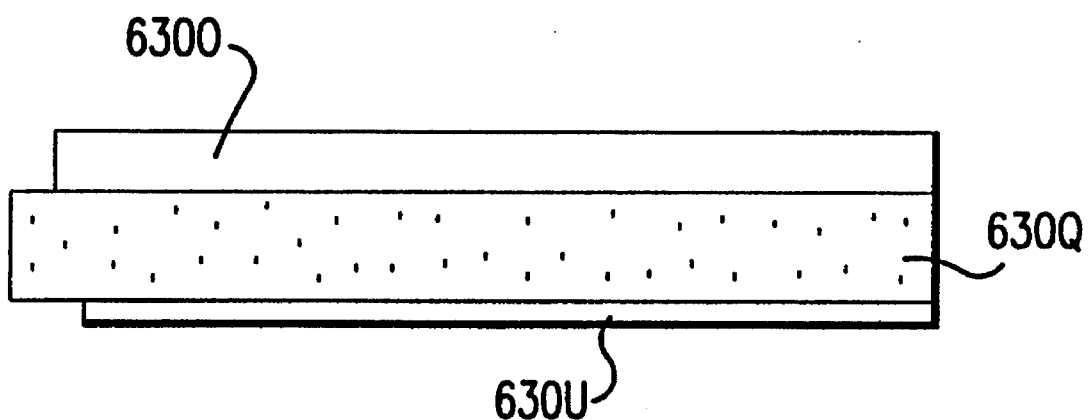

In step S526, the primitive white areas 630 within a group which touch and have common left and right edges are merged into a single primitive white area 630. As shown in FIGS. 22 and 23, primitive white areas 630O and 630P, and 630Q, 630R, 630S and 630T, each have common left and right edges. The seven primitive white areas in the three groups are merged into three primitive white areas 630O, 630Q and 630U as shown in FIG. 23.

In step S528, the removed primitive white areas 630 whose heights 47 are smaller than the height threshold 650 are then reexamined to determine if some of these reexamined primitive white areas 630 can be, in step S530, merged back into one of the remaining primitive white areas 630.

In step S532, the height 47 of each remaining primitive white area 630 is compared to the height threshold 650 or 640'. In step S534, primitive white areas 630 which have a height 47 greater than the height threshold 650 or 640' are determined to be major white regions 660.

Figure 24:
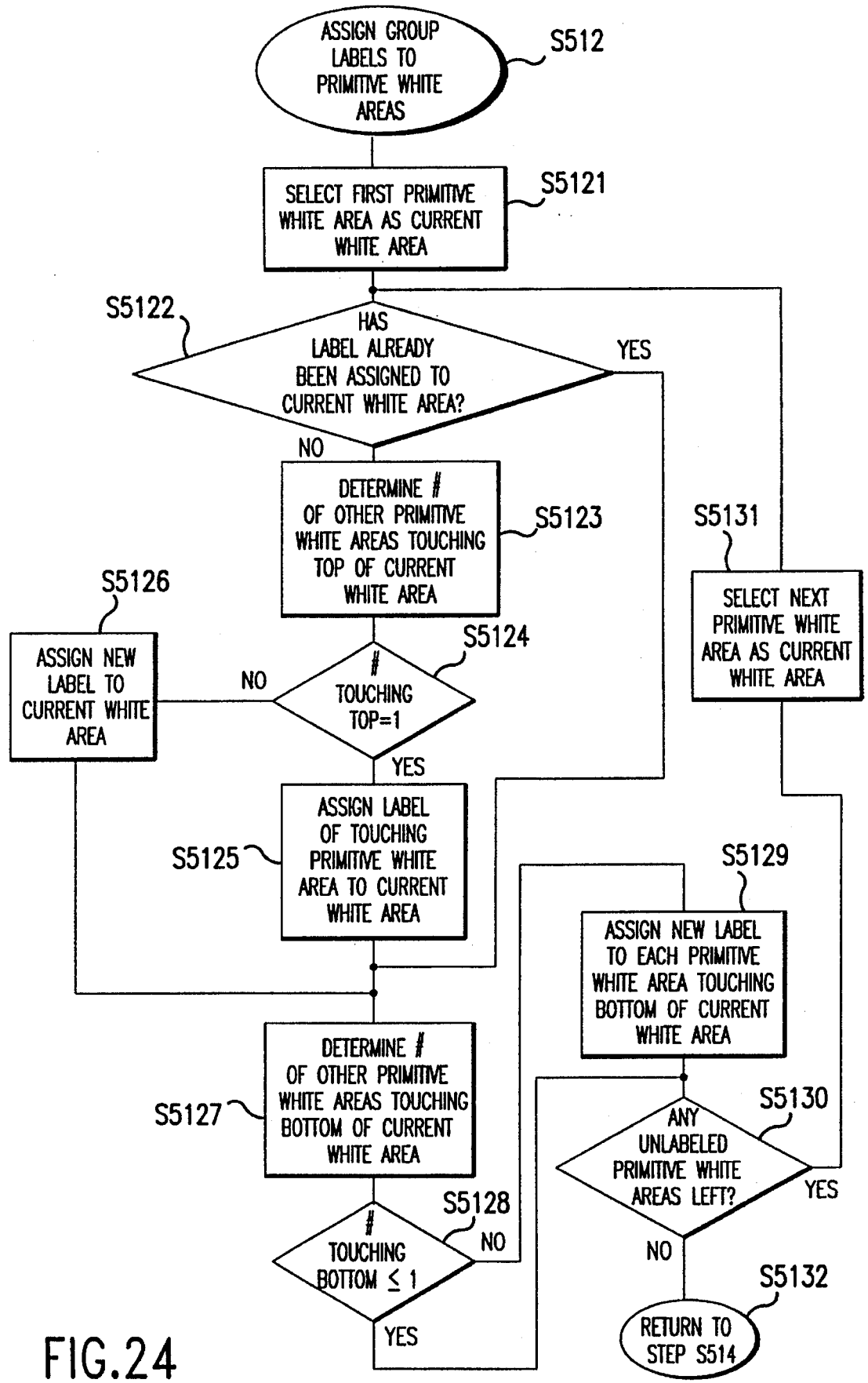
FIG. 24 is a flow chart of one embodiment of the method for assigning group labels to primitive white areas.

FIG. 24 outlines one preferred embodiment of the process of assigning labels to the primitive white areas 630 of step S512. In step S5121, the primitive white area 630-A of FIG. 18 located at the top of the document image is selected as the current white area. The primitive white area currently being examined is called the current primitive white area. In step S5122, the current primitive white area is checked to determine if a label has already been assigned to it. If so, control jumps to step S5127. If not, control continues to step S5123.

In step S5123, the number of other primitive white areas touching the top of the current primitive white area is determined. Of course, for the topmost primitive white area 630A, this will be zero. For other ones of the primitive white areas 630, there may be zero, one or more than one other primitive white area 630 touching it. Next, in step S5124, the number of other primitive white areas 630 touching the top of the current primitive white area determined in step S5123 is checked to see if it is exactly equal to one. If so, control continues to step S5125 where the label assigned to the single other primitive white areas 630 touching the top of the current primitive white area is assigned as well to the current primitive white area. Otherwise, if there are zero or more than one other primitive white areas touching the top of the current primitive white area, control jumps to step S5126, where a new label is assigned to the current primitive white area. This is, of course, the situation for the topmost primitive white area 630-A. Then, both steps S5125 and 5126 continue to step S5127.

In step S5127, the number of other primitive white areas 630 touching the bottom of the current primitive white area is determined. Then, in step S5128, the number touching the bottom of the current primitive white area is checked to determine if it is less than or equal to one. If so, control jumps to step S5130. If not, control continues to step S5129, where each one of the other primitive white areas 630 touching the bottom of the current primitive white area are assigned new and different labels.

Control then continues to S5130, where the document image is checked to determine if any of the primitive white areas 630 of the document 600 still need to be assigned labels. If so, control returns to step S5131, where the uppermost unassigned primitive white areas 630 is selected as the current primitive white area. Control then jumps from step S5131 back to S5122. Otherwise, if no unassigned primitive white areas 630 remain, control flows to step S5132. In step S5132, control is returned to step S514.

Figure 25:
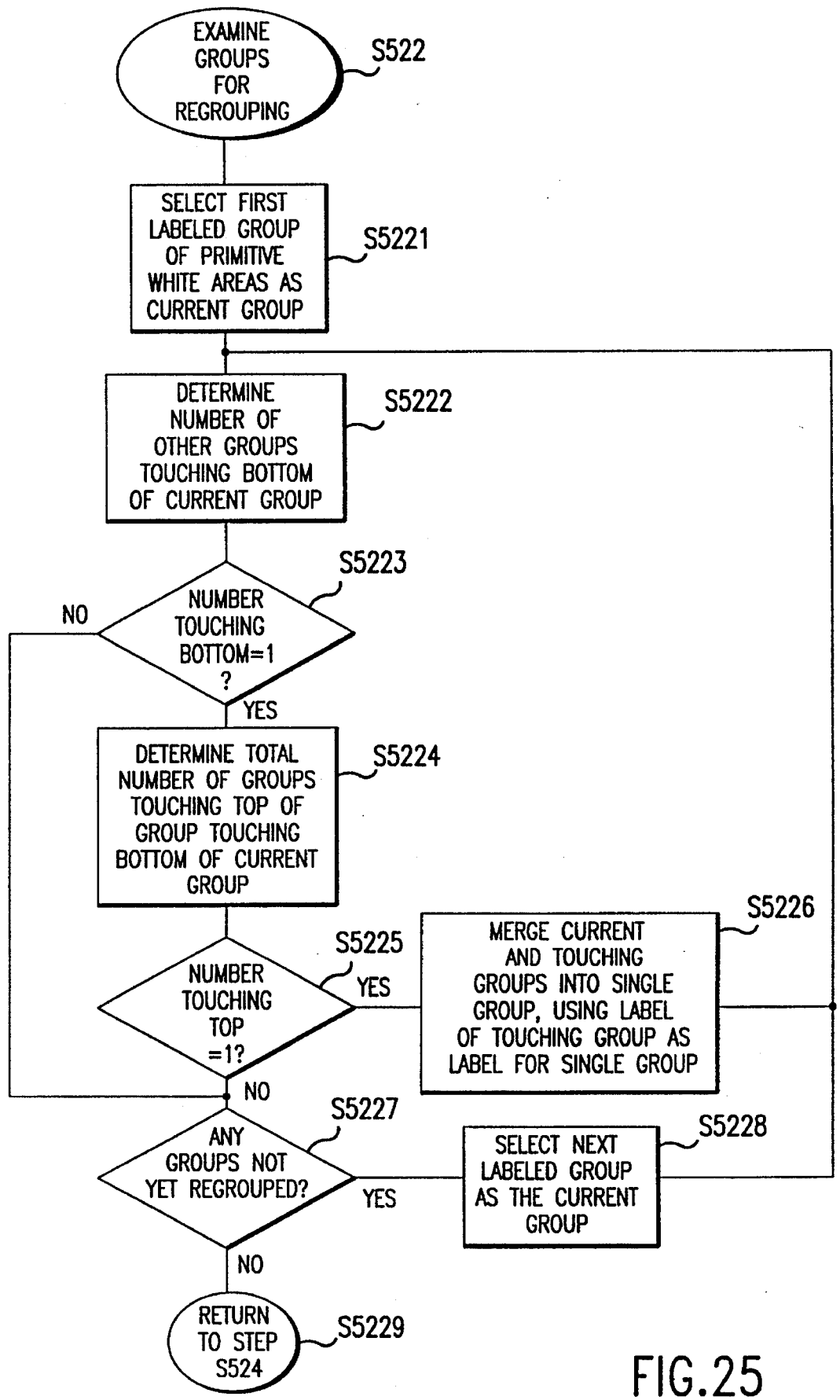
FIG. 25 is a flow chart of one embodiment of the method for examining remaining groups for regrouping.

FIG. 25 outlines one preferred embodiment for the method of grouping the primitive white area groups of step S522. In step S5221, the uppermost and leftmost unexamined white area group is selected as the current primitive white area group. In step S5222, the number of other primitive white area groups touching the bottom of the current primitive white area group is determined. In step S5223, if the number of other primitive white area groups touching the bottom of the current primitive white area group is not one, control jumps to step S5227. Otherwise, if the number is equal to one, control continues to step S5224. In step S5224, the total number of groups touching the top of the single groups touching the bottom of the current group is determined. Then, in step S5225, if the total number of touching groups is exactly equal to one, control continues to step S5226. Otherwise, control again jumps to step S5227. In step S5226, the label assigned to the single primitive white area group touching the bottom of the current primitive white area group is replaced with the label assigned to the current primitive white area group, thus merging the two groups. Control then returns to step S5222.

In step S5227, the document image 600 is checked to determine if any unexamined primitive white area groups remain in the document image 600. If so, control continues to step S5228, where the next group is selected as the current group. Then, control jumps back to step S5222. Otherwise, control jumps to step S5229, which returns control to step S524.

Figure 26A:
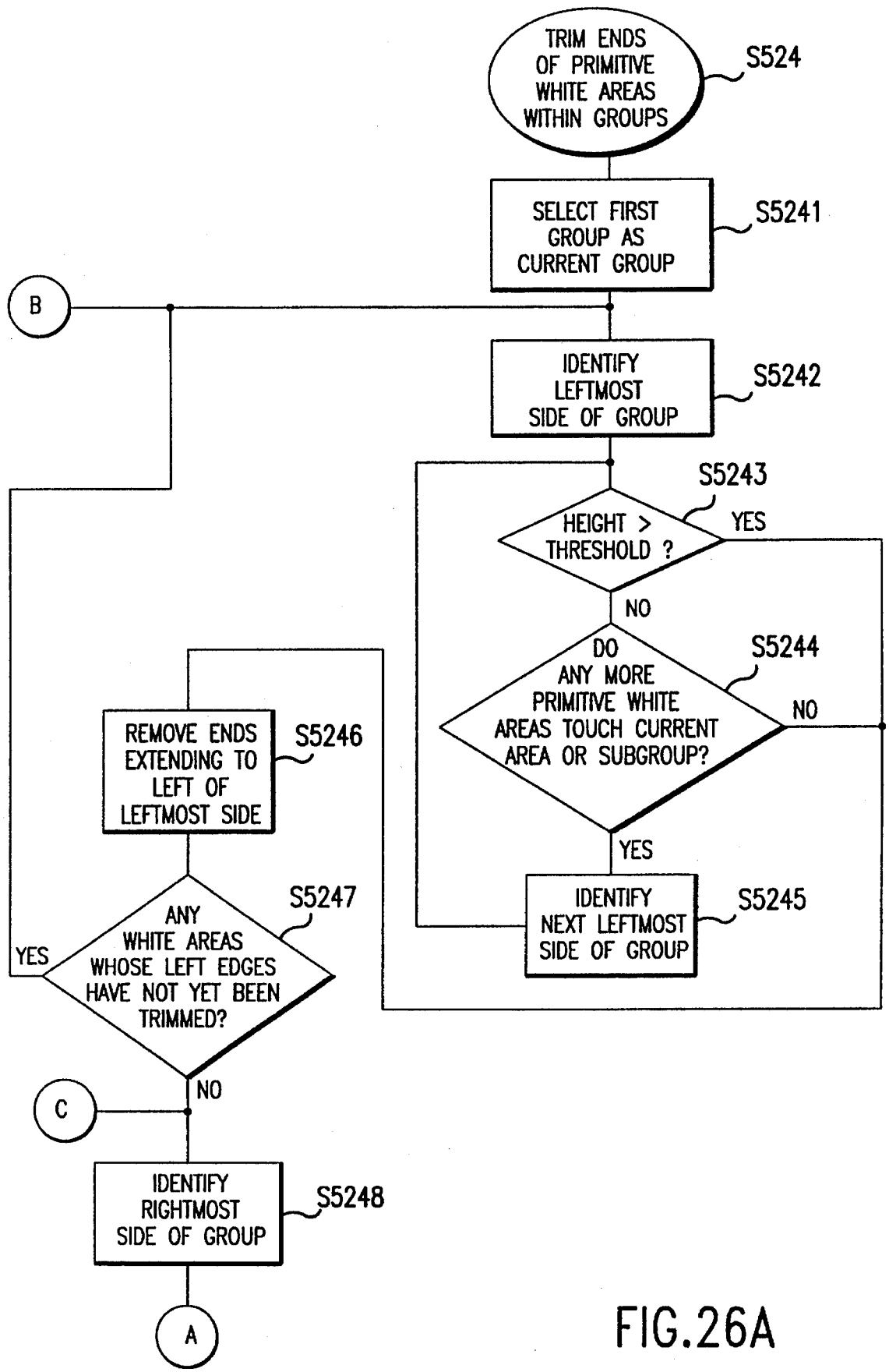
FIGS. 26A–B are a flow chart of one embodiment of the method for trimming ends of primitive white areas within groups.
Figure 26B:
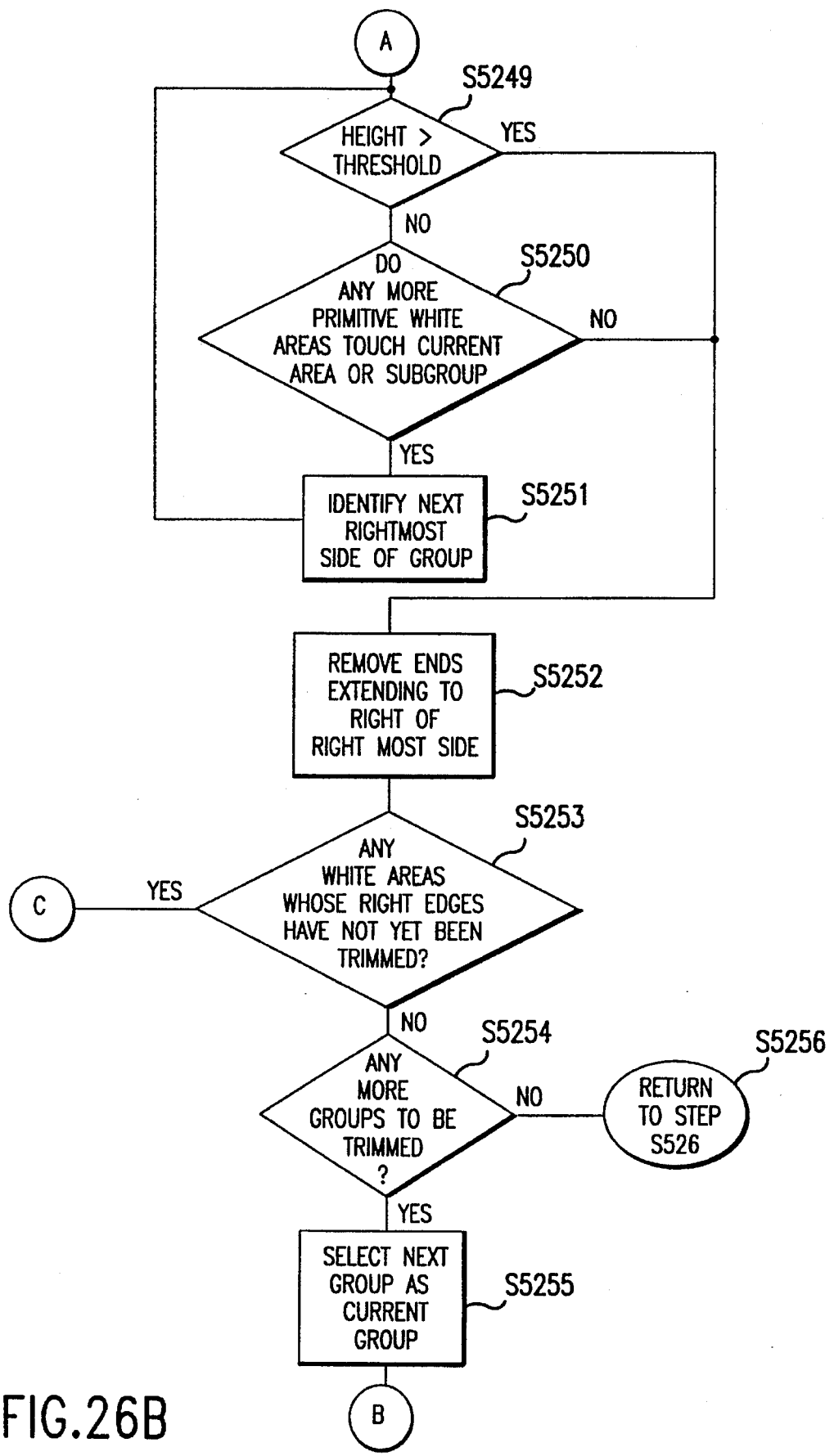

FIGS. 26A–B outline one preferred embodiment of the procedure for trimming the ends of the primitive white areas within a group of step S5241. First, in step S524, a first one of the primitive white area groups is selected as the current primitive white area group. Next, in step S5242, the leftmost side of the current primitive white area group is identified as the current leftmost side and the primitive white area of the current primitive white area group having the leftmost side is identified as the current area or current subgroup. Then, in step S5243, the height 47 of the current leftmost side of the current primitive white area or current subgroup of the current groups of primitive white areas is compared against the height threshold 650 or 640' if the height threshold 650 or 640' is not exceeded, control continues to step S5244, where the current group is checked to see if there are any remaining primitive white areas which touch the current area or subgroup.

If any touching primitive white areas remain, control continues to step S5245. Otherwise, if no touching primitive white areas remain, control jumps to step S5246. In step S5245, the next leftmost side of the current primitive white area which touches the current area or current subgroup is identified as the current leftmost side. This primitive white area is added to the current area to form the current subgroup or to the current subgroup. Control then returns to step S5243. This loop remains in place until the height threshold 650 or 640' is exceeded by the height 47 of the current area or subgroup or no more touching primitive white areas remain. Control then continues to step S5246.

In step S5246, the ends of the primitive white areas within the current primitive white area group which extend to the left of the current leftmost side of the current primitive white area or subgroup are removed. Control then continues to step S5247, which determines if there are any other primitive white areas of the current group whose left ends have not yet been trimmed and are not greater than the height threshold. If there are other areas whose left ends need trimming, control jumps back from step S5247 to step S5242.

If there are no other areas needing trimming, control continues to step S5248, which identifies the rightmost side of the primitive white area of the current primitive white area group as the current rightmost side. Control then continues to step S5249, where the height 47 of the current rightmost side is compared against the height threshold 650 or 640'. If the height threshold 650 or 640' is not exceeded, control continues to step S5250, where the current group is checked to see if there are any remaining primitive white areas which touch the current area or subgroup.

If any touching primitive white areas remain, control continues to step S5251. Otherwise, if no touching primitive white areas remain, control jumps to step S5252. In step S5251, the next rightmost side of the primitive white area which touches the current white area or subgroup of the current primitive white area group is identified as the current rightmost side. Control then returns to step S5249. This loop continues until the height threshold is exceeded or no more touching primitive white areas remain. Then, control continues to step S5252, where the ends of the primitive white areas of the current primitive white area or subgroup which extend to the right of the current rightmost side are removed.

Control then continues to step S5253, which determines if there are any other primitive white areas of the current group whose right ends have not yet been trimmed and are not greater than the height threshold. If there are other areas whose right ends need trimming, control jumps back to step S5248. Otherwise, if there are no other areas needing trimming, control continues to step S5254, which determines if there are any untrimmed primitive white area groups remaining within the document image 600. If there are, control continues to step S5255, where a next primitive white area group is selected as the current primitive white area group. Control then returns to step S5242. Otherwise, if all of the primitive white area groups of the document image 600 have been trimmed, control continues to step S5256, which returns control to step S526.

FIGS. 27–29 graphically show the operation of the trimming process outlined in FIGS. 26A–26B. As shown in FIG. 27, a group 48 comprises individual primitive white areas 631–637. Initially, primitive white area 635 and 636 define the left-most edge of the group 48. The vertical height 47 of the common left edge of the primitive white areas 635 and 636 is compared to the height threshold 650. As shown in FIG. 27, the height threshold 650, when measured from the bottommost edge of the primitive white area 636, extends beyond the top edge of the primitive white area 634 but below the top edge of the primitive white area 633. Thus, primitive white areas 635 and 636 are grouped together as the current subgroup and the primitive white areas touching this current subgroup are identified. In FIG. 27, this includes primitive white areas 634 and 637.

Accordingly, the left edge of the primitive white areas 635 and 636 is trimmed back to the left edge of the primitive white area 634, as shown in FIG. 28. That is, the current group is trimmed back to the leftmost edge of those primitive white areas touching the current group. The height of this new left edge is then compared to the height threshold 650. Since the height threshold 650 is still not exceeded, primitive white area 634 is added to the current group, and the primitive white areas touching this new current group are identified. The left edge of the primitive white areas 634–636 is further trimmed back to the left edge of the primitive white area 633. Similarly, the left-edge of the primitive white area 631 is also trimmed back to the left edge of the primitive white area 632. The left edge of the current area or group is always adjusted or trimmed to the next leftmost edge of the primitive white areas which touch the current area or group.

In FIGS. 27–29, the primitive white area 632 touches the primitive white area 631 but the other primitive white areas 633–637 do not. While the height 47 of the primitive white area 631 does not figure into the comparison against the height threshold 650, primitive white area is also trimmed back so that the leftmost point of the group 48 does not extend any further left than the leftmost edge of the trimmed subgroup of primitive white regions which do exceed the height threshold 650. Since, as shown in FIG. 29, the leftmost edge of the group 48 defined by the primitive white areas 633–636 exceeds the height threshold 650, the trimming process for the leftmost edge of the group 48 is finished.

This process is then repeated for the right most edge of the group 48. In this case, the rightmost edge of the group 48, defined by the rightmost edge of the primitive white area 636 and 637 would first be trimmed back to be collinear with the rightmost edges of the primitive white areas 631 and 632. Since these primitive white areas are not adjacent, and neither alone exceeds the height threshold 650, the rightmost edges of the primitive white areas 631,632, 636, and 637 is further trimmed back to the rightmost edge of the primitive white areas 633 and 634. Since the rightmost edge defined by the primitive white areas 631–634 now exceeds the height threshold 47, the trimming process is complete.

Figure 30:
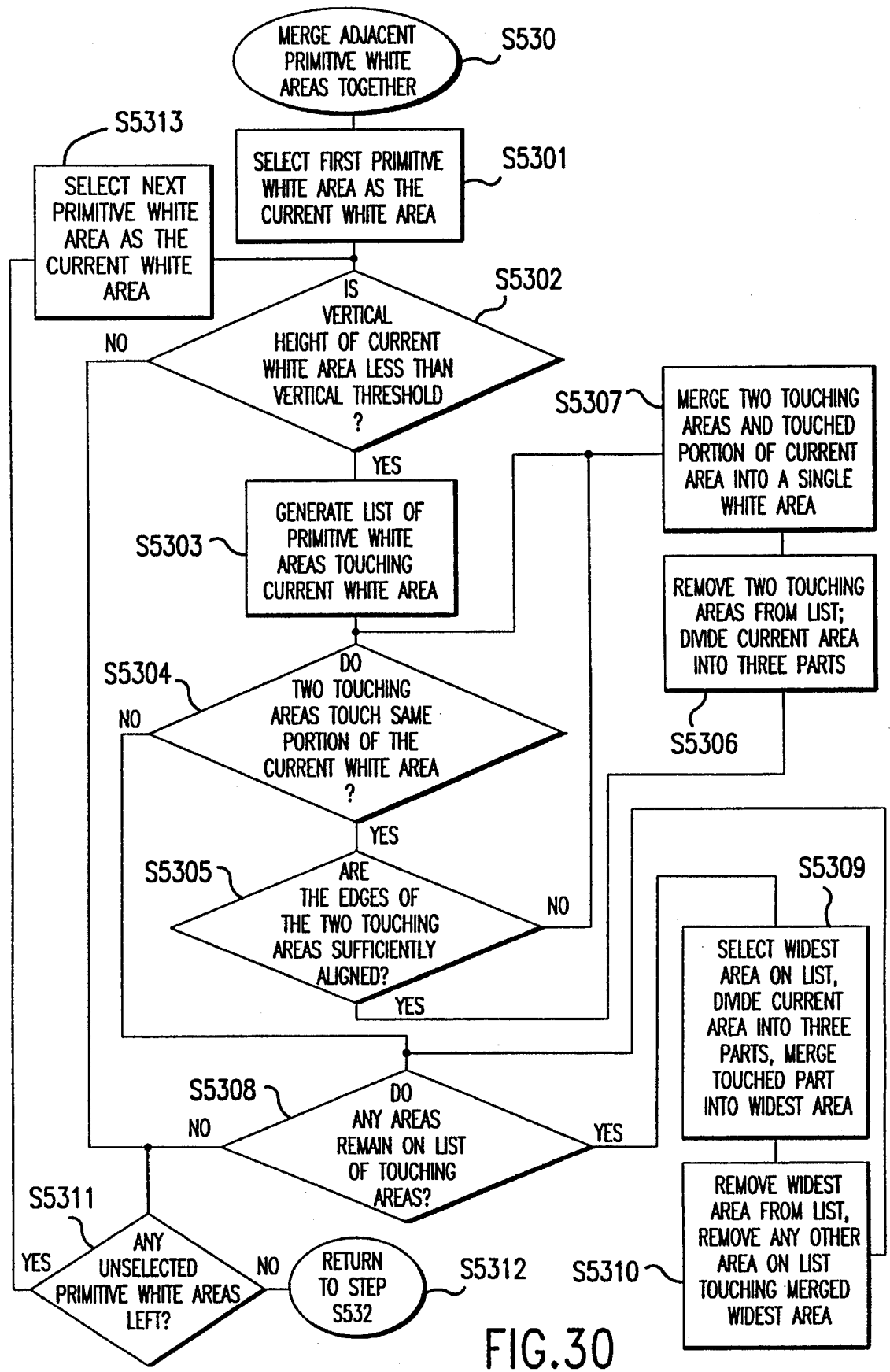
FIG. 30 is a flow chart of one embodiment of the method for merging adjacent primitive white areas into a single primitive white area.

FIG. 30 outlines one preferred embodiment of the process for merging two or more primitive white areas 630 into a single primitive white area 630 of step S530. In step S5301, a first primitive white area 630 is selected as the current primitive white area. In step S5302, the current white area is checked against the vertical threshold to determine if its vertical height is less than or more than the vertical threshold. If the vertical height of the current area is more than the vertical threshold, control jumps from step S5302 to S5311. Otherwise, if the vertical height of the current white area is less than the vertical threshold, control continues to step S5303.

Figure 31:
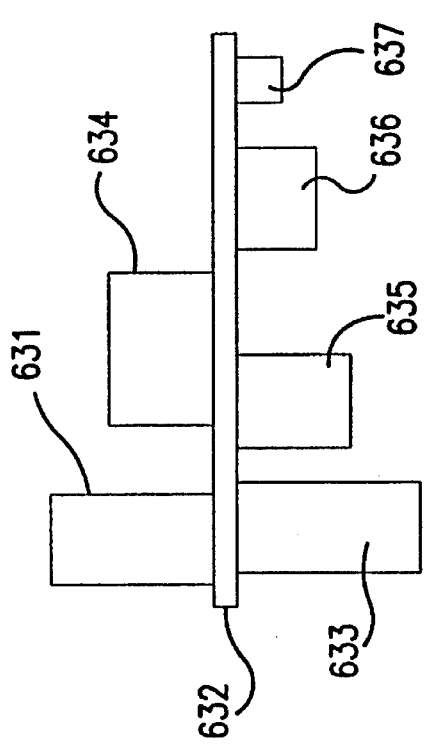

In step S5303, a list of other primitive white areas which touch the current primitive white area is generated. Then, in step 5304, the list of touching area is checked to determine if two of the touching area touch the same portion of the current white area. For example, as shown in FIG. 31, the touching primitive areas 631 and 633 touch the same portion of the current white area 632. Likewise, the touching primitive white areas 634 and 635 also touch the same portion of the current white area 632. If there are no pairs of touching areas on the list which touch the same portion of the current white area, control jumps to step S5308. Otherwise, if there are two touching area which touch the same portion of the current white area, control continues to step S5305.

In step S5305, the edges of the pair of touching areas are checked to determine if they sufficiently align. For example, as shown in FIG. 31, the edges of the touching white areas 631 and 633 are sufficiently aligned, while the edges of the touching areas 634 and 635 are not sufficiently aligned. In each pass through step S5304, one pair of two touching area is selected and in step S5305 the selected pair is checked. If, in step S5305, the edges are not sufficiently aligned, control jumps back to step S5304 which checks another one of the pairs of touching areas. This loop, through step S5305 and back to step S5304, will continue until each touching pair is checked.

Figure 32:
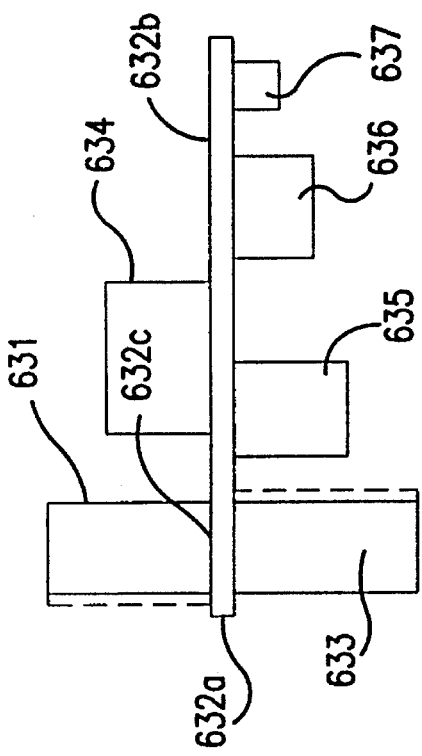
FIGS. 31–34 graphically illustrate how primitive white areas are merged with other adjacent primitive white areas.
Figure 33:
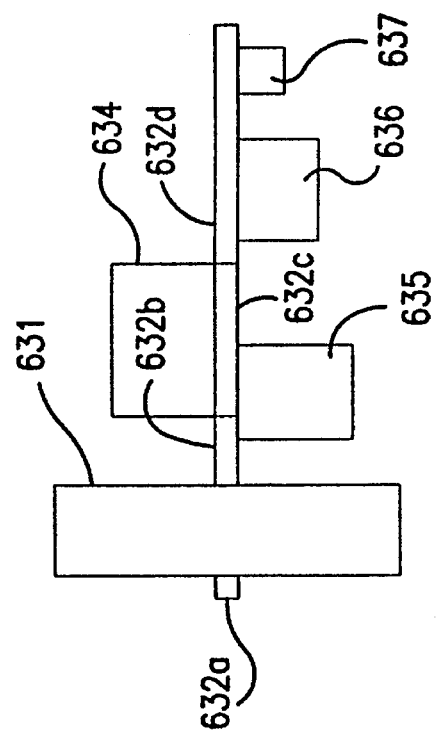

If, in step S5305, the edges of the pair of touching areas are sufficiently aligned, control continues to step S5306, where the pair of touching areas are removed from the list of touching areas and the current white area is divided into three parts, as shown in FIG. 32. Of course, if both left edges of the pair of touching areas, or both right edges, are aligned, respectively, with the left edge or the right edge of the current white area, the current white area will only be divided into two portions. Then, in S5307, the two touching areas and the touched portion of the current white area are merged into a single white area. This process is shown in FIGS. 32 and 33, where the touching white areas 632 and 633 and the touched portion 632c of the current white area 632 are merged into a single white area 631. Then, control returns to step S5304 to check another one of the pairs of touching areas.

Once all the pairs of touching areas have been analyzed in the loop of steps S5304–5307, control jumps from step S5304 to step S5308. In step S5308, the list of touching areas is checked to determine if any areas remain on the list. If no touching areas remain on the list, control jumps from step S5308 to step S5311. Otherwise, if areas do remain on the list of touching areas, control continues to step S5309.

Figure 34:
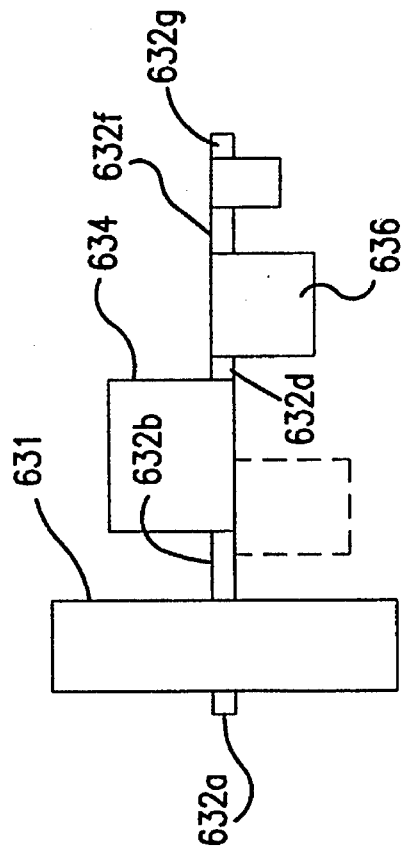

In step S5309, the widest touching area which remains on the list of touching areas is selected, and the part of the current white area which is touched by the selected widest area is further divided into three portions. As shown in FIGS. 32 and 33, the widest remaining portion 634 touches portion 632b of the current white area 632. Accordingly, the portion 632b is further divided into an untouched portion 632d and a touched portion 632e. As shown in FIG. 34, the touched portion 632e is merged into the widest area 634.

Then, in step S5310, the selected widest area is removed from the list and any other area on the list which touches the same portion of the current primitive white area as the selected widest area is also removed from the list from touching areas. Then, control jumps back from step S5310 to step S5308, to again determine if any areas remain on the list of touching areas. Once all the touching areas remaining on the list have been selected, and the portions of the current white area they touch merged into them, control jumps from step S5308 to S5311, which determines if any unselected primitive white areas are left in the document image. If so, control jumps from step S5311 to step S5313, where the next primitive white area is selected as a current white area. Once the next primitive white area is selected as the current white area in step S5313, control jumps back to step S5302, where the current white area is again checked against the vertical threshold. Otherwise, if all of the primitive white areas of the document image have been selected and compared against the vertical threshold, control continues to step S5312, which returns control to step S532.

As shown in FIG. 31, a current white area 632 is touched by six other primitive white areas 631 and 633–637. The primitive white areas 631 and 634 would have been previously compared against the vertical threshold, and if they are less than it, would have been previously analyzed. In this case, neither one of the touching primitive areas 631 or 634 is less then the vertical threshold. Once the list of touching white areas is generated, as described above, those touching primitive white areas which touch a common portion of the current primitive white area 632 and have edges which are sufficiently aligned are merged into a single white area. Thus, as shown in FIG. 32, the touching primitive white areas 631 and 633 are merged together, along with the commonly touched portion 632c of the current portion 632. In addition, the edges of the touching primitive area 631 and 633 are trimmed back to be aligned with the edges of the commonly touched portion 632c. Because the edges of the other touching white areas 634 and 635, which also touch a common portion of the current primitive white area are not sufficiently aligned, they are not merged together.

Then, as shown in FIG. 33, the widest remaining touching area on the list of touching areas is selected and the touched portion 632e of the current white portion 632 is merged into the selected widest remaining touching white area 634. At the same time, any other touching area on the list of touching areas which also touches the touched area 632e is removed from the list of touching areas. This process of locating the widest remaining touching area continues until no touching primitive white areas remain in the list of primitive white areas. Thus, as shown in FIG. 34, the touched portions of the current area 632 are merged into the touching white areas 636 and 637 and the current white area is further divided into untouched portions 632d, 632f and 632g.

Figure 35:
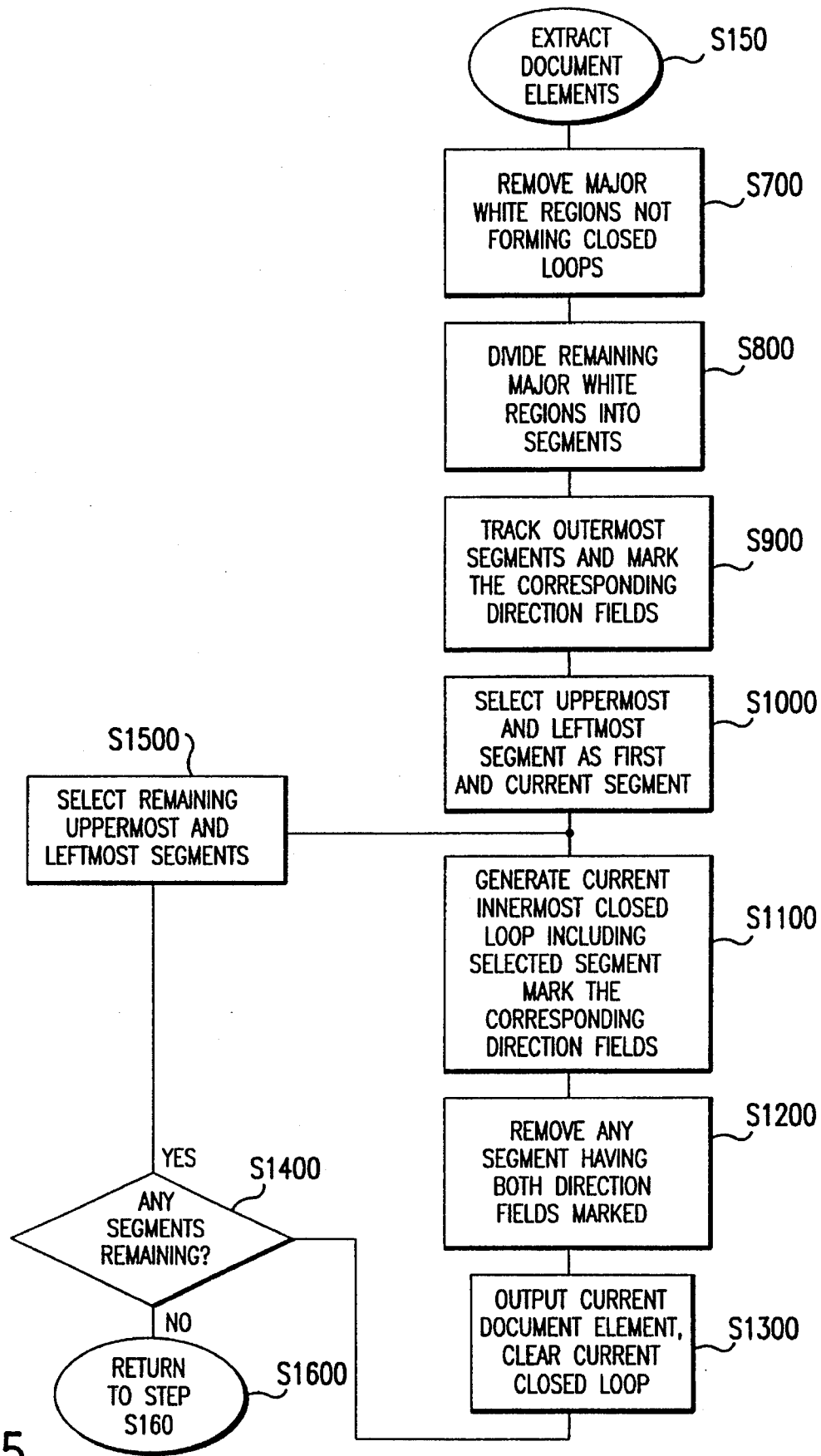
FIG. 35 is a flow chart of one embodiment of the method for extracting document elements.

FIG. 35 outlines one preferred embodiment of the method for extracting document elements of step S150. As shown in FIG. 35, to extract the document element 670, the major white regions 660 not forming closed loops are removed. Then, in step S800, the remaining major white regions 660 are divided into segments. In step S900, the outermost segments, i.e., those segments closest to the boundaries of the document image 600, are tracked in a first direction and the corresponding direction field of each tracked segment is marked. In step S1000, the first uppermost horizontal segment from the list of segments is selected as the first and the current segment.

Next, in step S1100, a current closed loop which includes the first segment is generated by moving in the direction opposite to the first direction and the direction field of each segment corresponding to this direction is marked. Then, in step S1200, those segments which have both direction fields marked are removed. In step S1300 the current document element 670 defined by the current closed loop is output. Then, in step S1400, the list of segments is checked to determined if any segments remain on the list. If so, control continues to step S1500, where the uppermost horizontal segment remaining on the list is selected from the list of segments. Control then returns to step S1100. If no segments remain on the list of segments, control continues from step S1400 to step S1600, which returns control to step S160.

Figure 36:
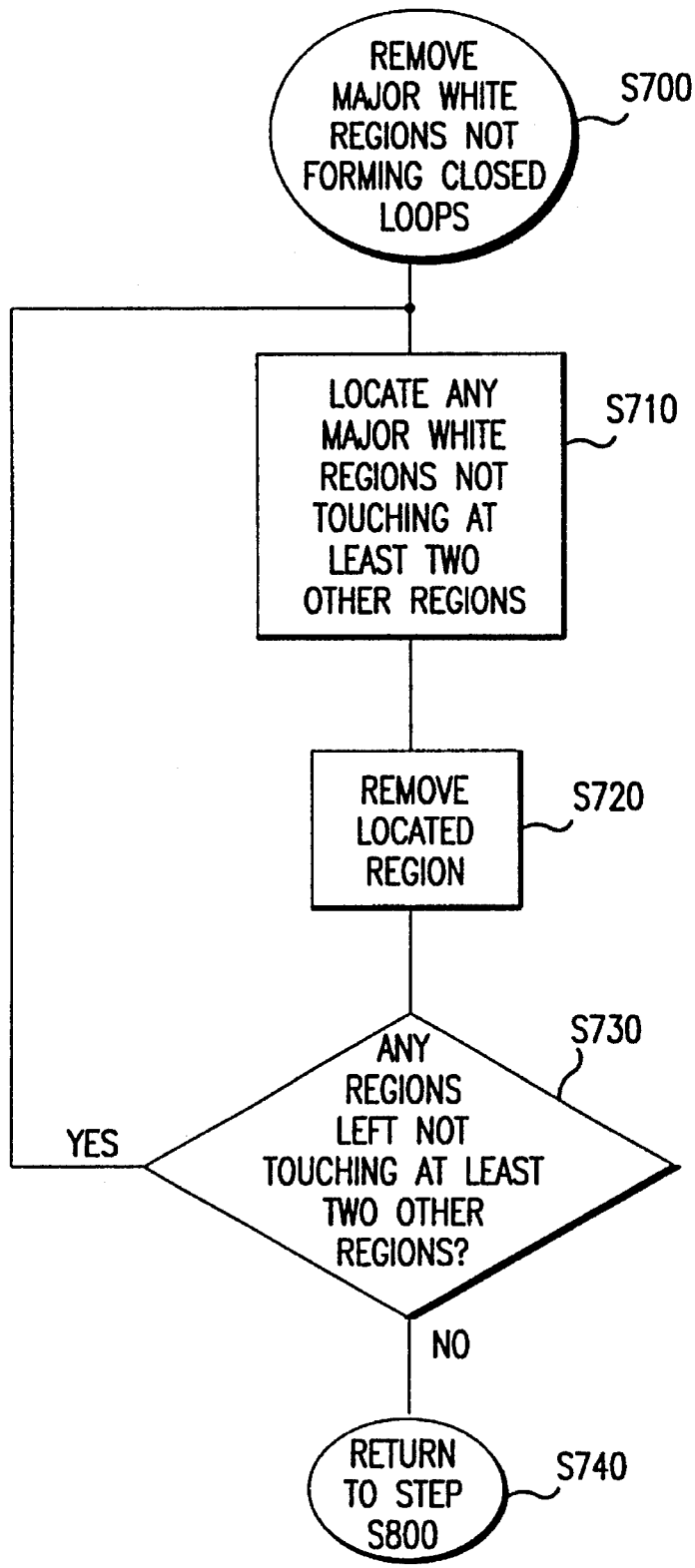
FIG. 36 is a flow chart of one embodiment of the method for removing major white regions not forming closed loops.
Figure 40:
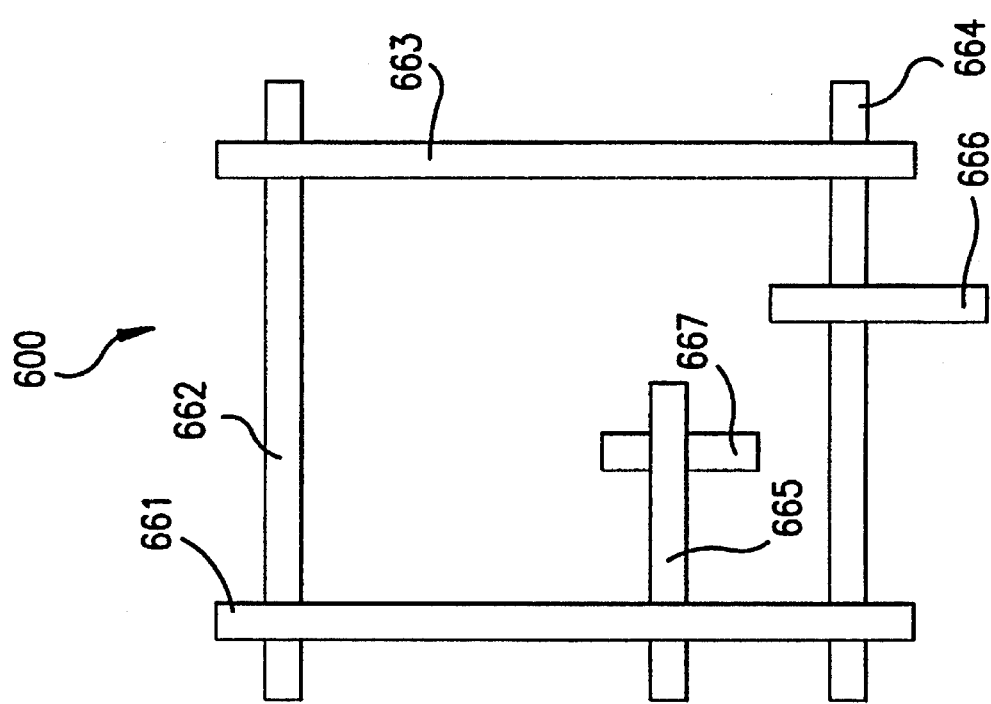
FIG. 40 shows a document image segmented into major white regions before major white regions are removed.

FIG. 36 outlines one preferred embodiment of the process for removing major white regions not forming closed loops of step S700. First, in step S710, any major white regions 660 not touching at least two other major white regions 660 are located. This is graphically shown in FIG. 40, where the major white regions 666 and 667 of the major white regions 661–667 forming the document image 600 each touch only one other major white region. Accordingly, those regions are removed in step S720. Then, in step S730, the document image 600 is again checked to determine if there are any remaining regions which fail to touch at least two other regions. As shown in FIG. 40, the major white region 665 initially touched two other major white regions 661 and 667. However, because major white regions 667 was previously removed, the major white region 665 now touches only one other major white region.

Figure 41:
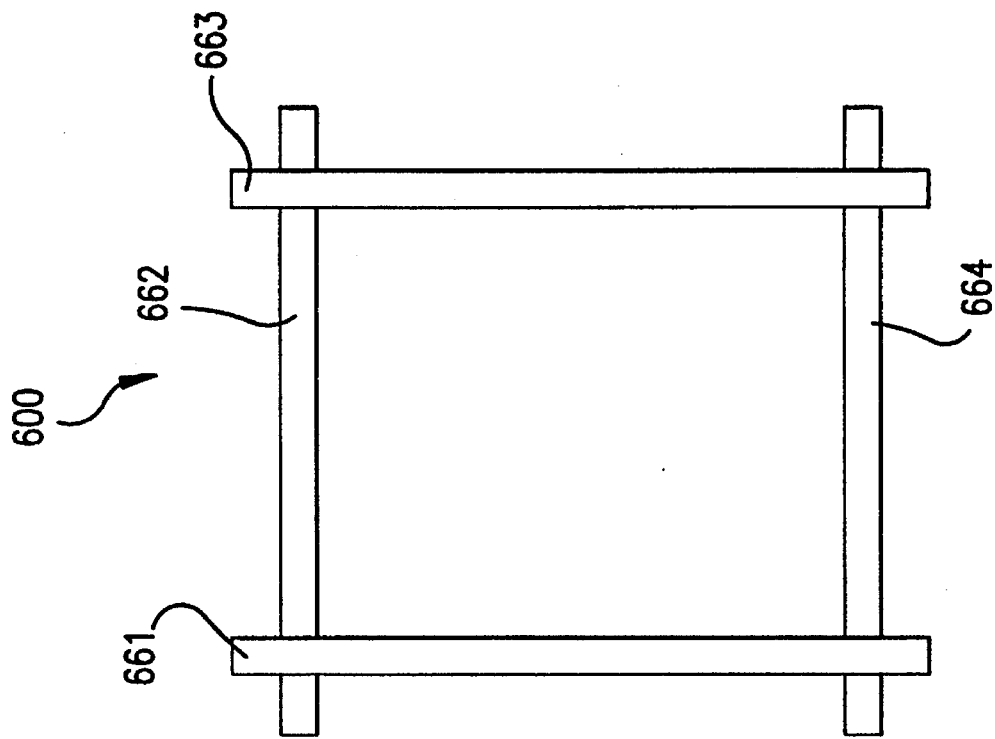
FIG. 41 shows the document image of FIG. 40 with the major white regions not forming closed loops removed.

If any major white regions are left which fail to touch at least two other major white regions, control jumps from step S730 back to step S710. If no other major white regions are left which fail to touch at least two other major white regions, control continues from step S730 to step S740 where control is returned to step S800. Thus, the document image 600 in FIG. 40 has the major white region 665–666 removed leaving the major white region 661–664, as shown in FIG. 41.

Figure 37:
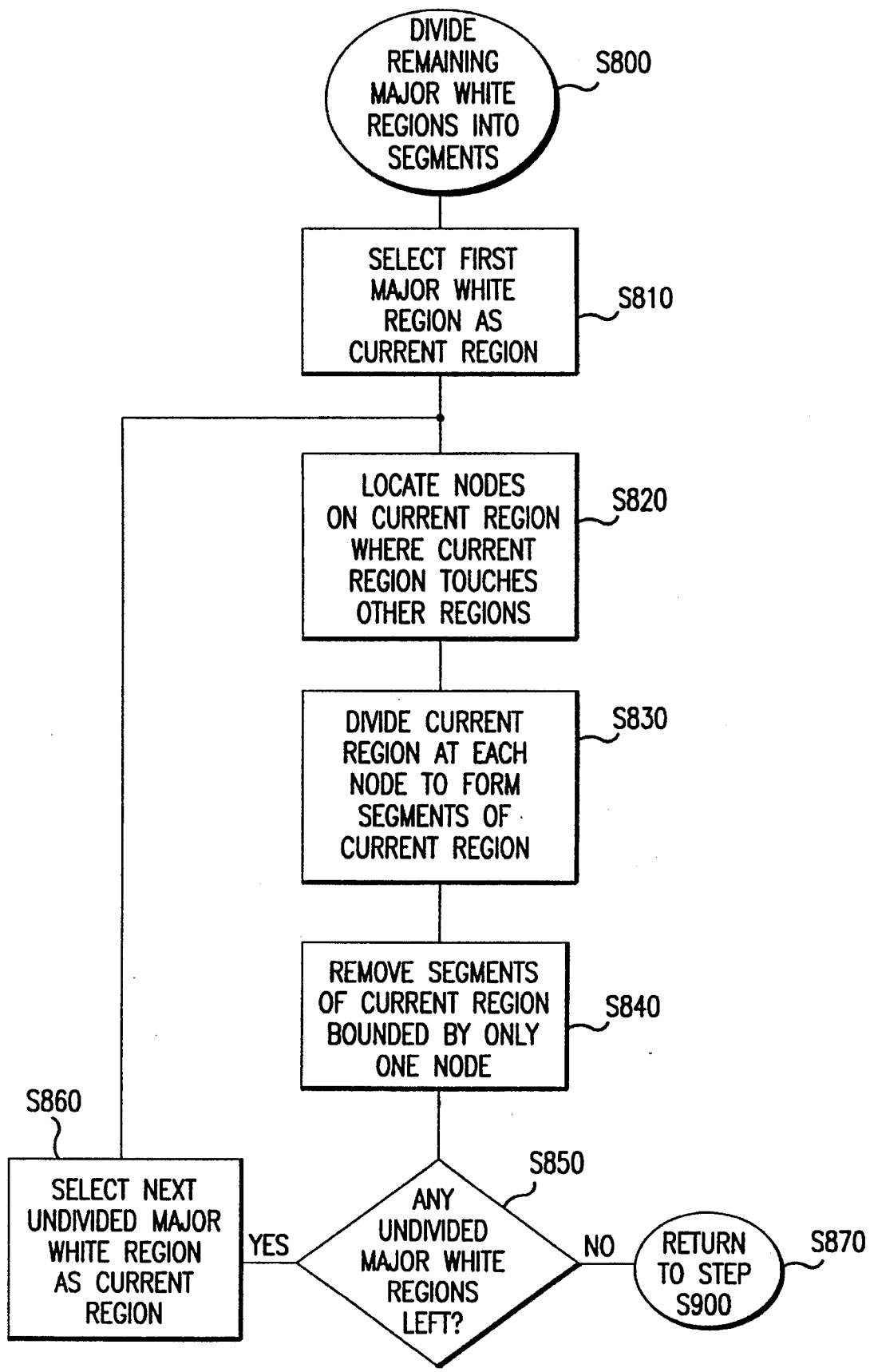
FIG. 37 is a flow chart of one embodiment of the method for dividing remaining major white regions into segments.
Figure 43:
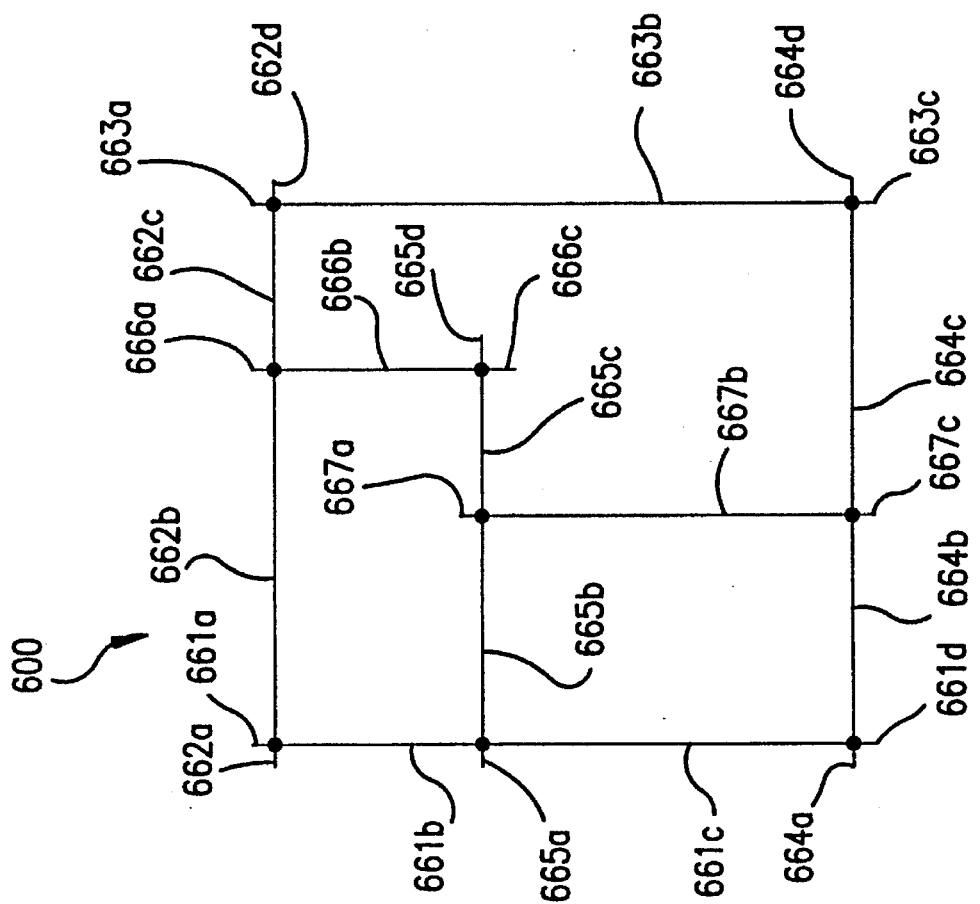
FIG. 43 shows the document image of FIG. 42 divided into segments.
Figure 42:
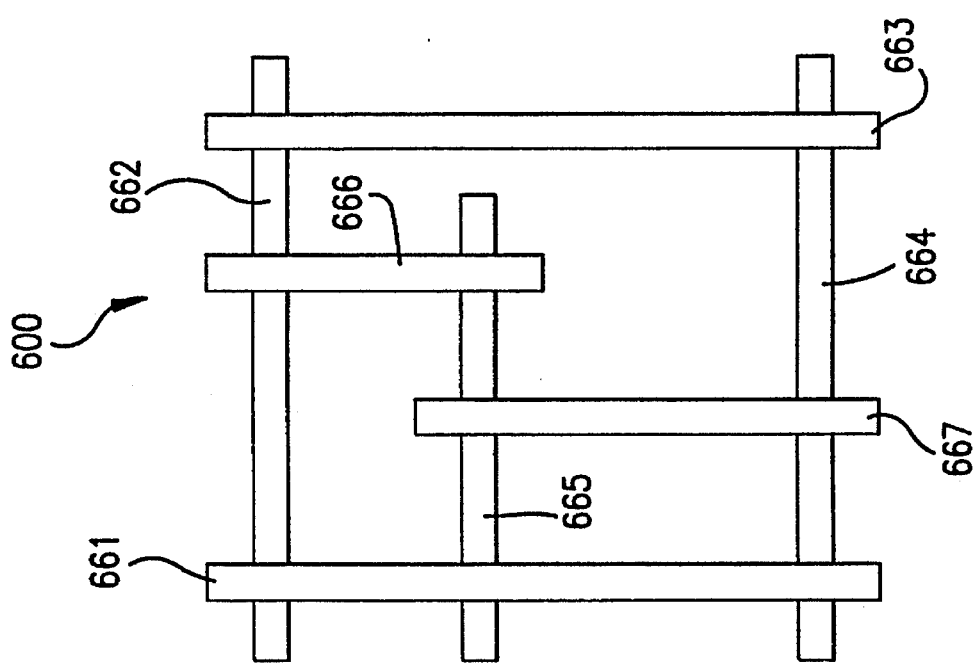
FIG. 42 shows another document image before the remaining major white regions are divided into segments.

FIG. 37 shows one preferred embodiment for the process for dividing remaining major white regions into segments of step S800. First, in step S810, one of the major white regions 660 is selected as a current major white region. Next, in step S820, the intersection points on the current major white region 660, i.e., those places where it touches other major white regions 660, are located. Then, in step S830, the current major white region is divided at each intersection point to form segments. This process is graphically shown in FIGS. 42 and 43. In FIG. 42, the document image 600 comprises major white regions 661–667. As shown in FIG. 43, the major white region 661 has three intersection points where it crosses the major white region 662,664 and 665. Accordingly, the major white region 661 is divided into four segments 661a–661d. Similarly, the major white region 662 has three intersection points, where it is crossed by major white regions 661,666 and 663. Accordingly, the major white region 662 is divided into segments 662a–d. In the same manner, the major white regions 663–667 are divided into segments 663a–663c, 664a–664d, 665a–665c, 666a–666c, and 667a–667c.

Figure 44:
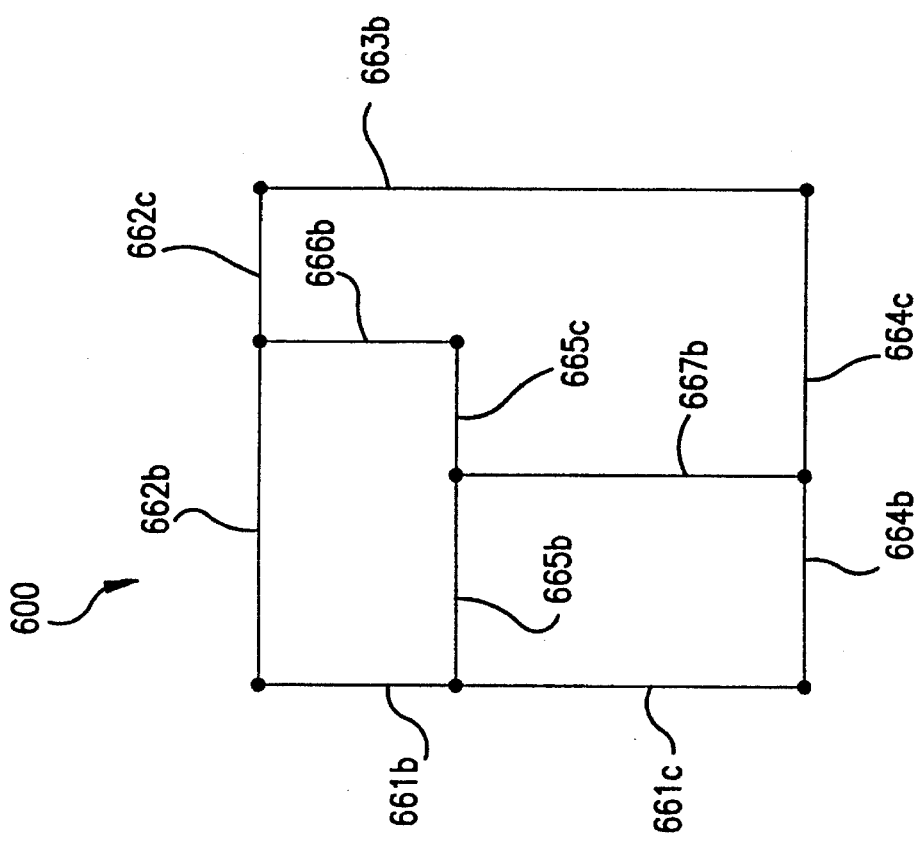
FIG. 44 shows the segmented document image of FIG. 43 with segments bounded by only one intersection point removed.

Next, in step S840, those segments of the document image 600 which are bounded by only a single intersection point are removed, as shown in FIG. 44. As shown in FIG. 44, the segments 661a, 661d, 662a, 662d, 663a, 663c, 664a, 664d, 665a, 665d, 666a, 666c, 667a, and 667c are removed from the document image 600, as they each have one end which is not bounded by an intersection point. Accordingly, this leaves segments 661b–c, 662b–c, 663b, 664b–c, 665b–c, 666b and 667b remaining on the document image 660.

Next, in step S850, after the current major white region has been segmented and its unbounded segments removed, the document image 600 is checked to determine if any major white regions which have not yet been divided remain. If so, control flows to step S860 where the next undivided major white region is selected as the current region. Control then jumps back to step S820. If no major undivided white regions remain in the document image 600, control jumps from Step S850, to step S870, which returns control to step S900.

Figure 38:
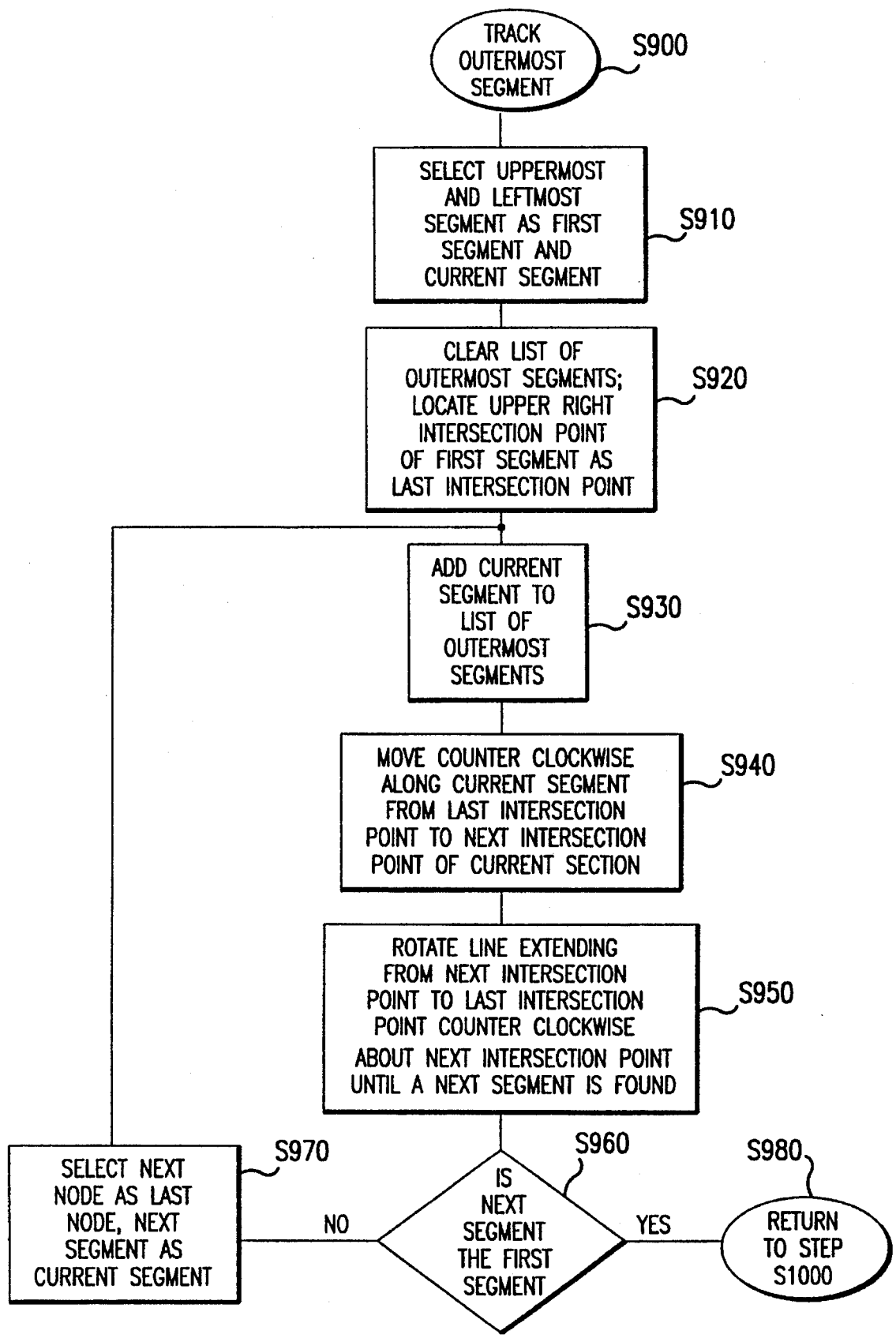
FIG. 38 is a flow chart of one embodiment of the method for generating a list of outermost segments.

FIG. 38 shows one preferred embodiment of the method for generating lists of outermost segments of step S900. Each segment has two fields associated with it for representing that the segment has been tracked in each direction (left to right and right to left for horizontal segments, and top to bottom and bottom to top for vertical segments) First, in step S910, the uppermost and leftmost horizontal segment is selected as the first segment and as the current segment. It should be appreciated that selecting a horizontal support is not required, and that a vertical segment can be selected instead. The field representing the direction, left to right, in the selected segment is marked. For the document image 600 shown in FIG. 45, this would be the segment 662b.

Figure 45:
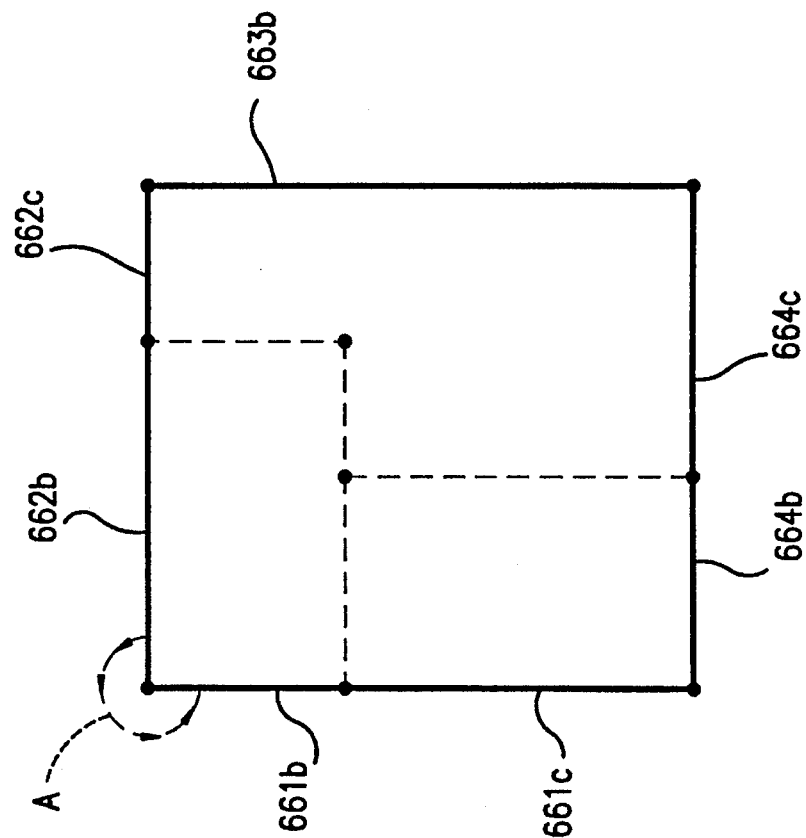
FIG. 45 shows the document image of FIG. 44 with the list of outermost segments generated.

Next, in step S920, the right intersection point of the first segment is selected as the last intersection point. In FIG. 45, this would be the intersection point joining segments 662b and 662c.

Then, in step S940, the current segment is tracked by moving counter clockwise along the current segment from the last intersection point until the next intersection point of the current segment is encountered. Then, in step S950, a next segment is selected by searching counterclockwise about the next intersection point until a segment is found, starting from the opposite direction of the tracking. In FIG. 45, this would be segment 661b, with the motion about the left hand intersection point of segment 662b shown by line A. The field corresponding to the tracked direction, right to left, of segment 662b is then marked.

Then, in step S960, the next segment is checked to see if it is the first segment. If not, control continues to step S970, where the next intersection point is selected as the last intersection point and the next segment is selected as the current segment. Control then returns to step S930. This process then tracks segments 661c, 664b, 664c, 663b and 662c. The fields corresponding the tracked directions in each segment are marked.

However, if in step S960, the next segment is the first segment, control jumps to step S980 which returns control to step S1000. It should be appreciated that any one of the segments can be selected as the starting position of step S910.

Figure 39:
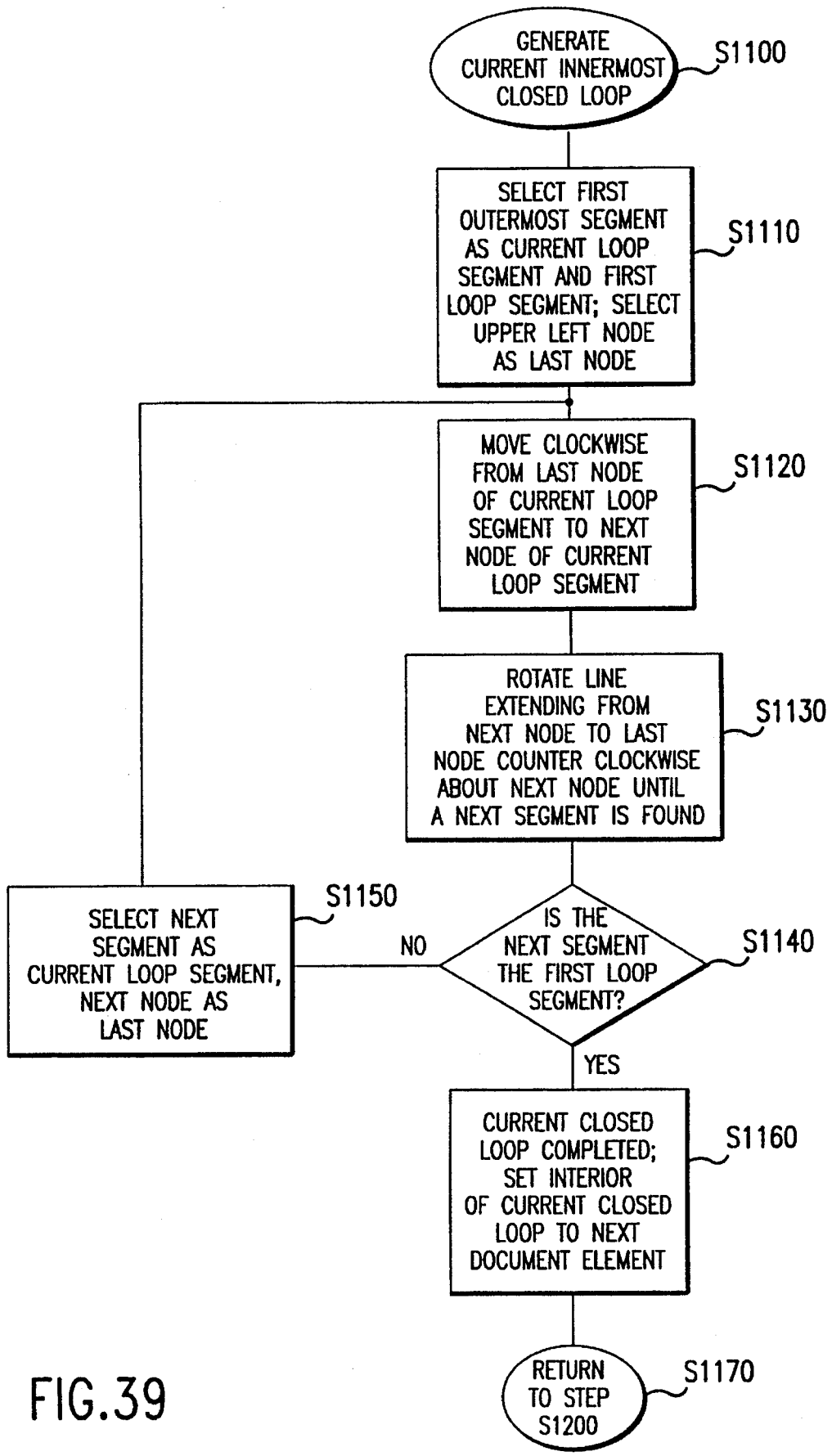
FIG. 39 is a flow chart of one embodiment of the method for generating current innermost closed loops.
Figure 46:
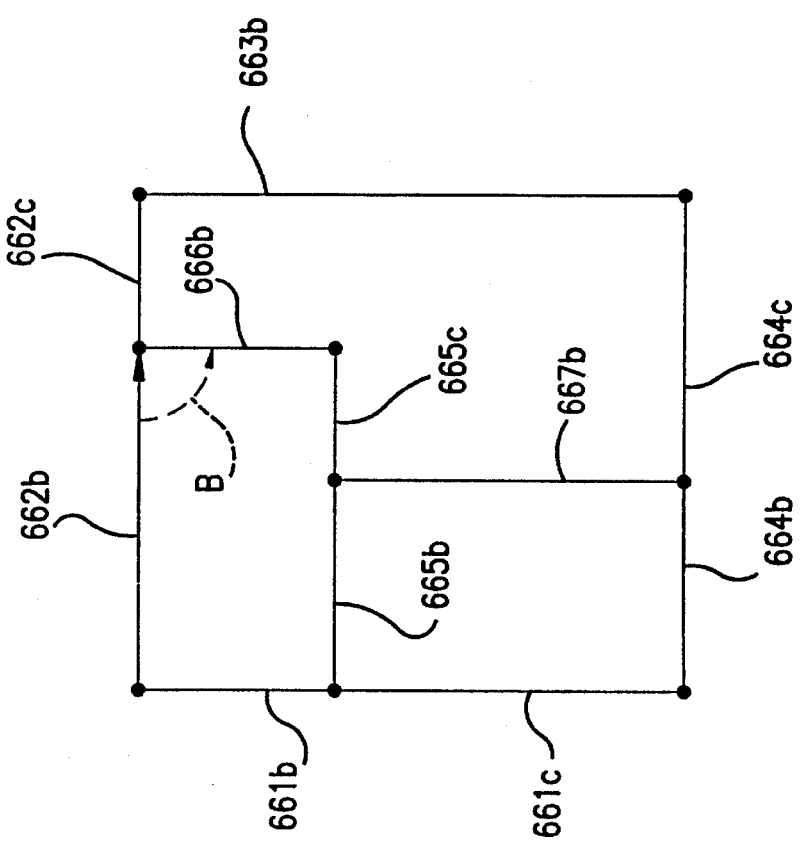
FIG. 46 graphically illustrates how to form the inner closed loops.

FIG. 39 shows one preferred embodiment of the method for generating the current innermost closed loop of step S1100. First, in step S1110, the uppermost horizontal segment of the list of segments is selected as a first loop segment and as a current loop segment and the left intersection point of the current outermost segment is selected as the last intersection point. Then, in step S1120, the current loop segment is scanned by tracking clockwise from the last intersection point until the next intersection point of the current loop segment is encountered. Then, in step S1130, a next segment is selected by searching counterclockwise about the next intersection point until a segment is found, starting from the opposite direction of the tracking. As shown in FIG. 46, the line formed in step S1130 is rotated counterclockwise along the line B about the right-hand intersection point of the segment 662b.

Figure 47:
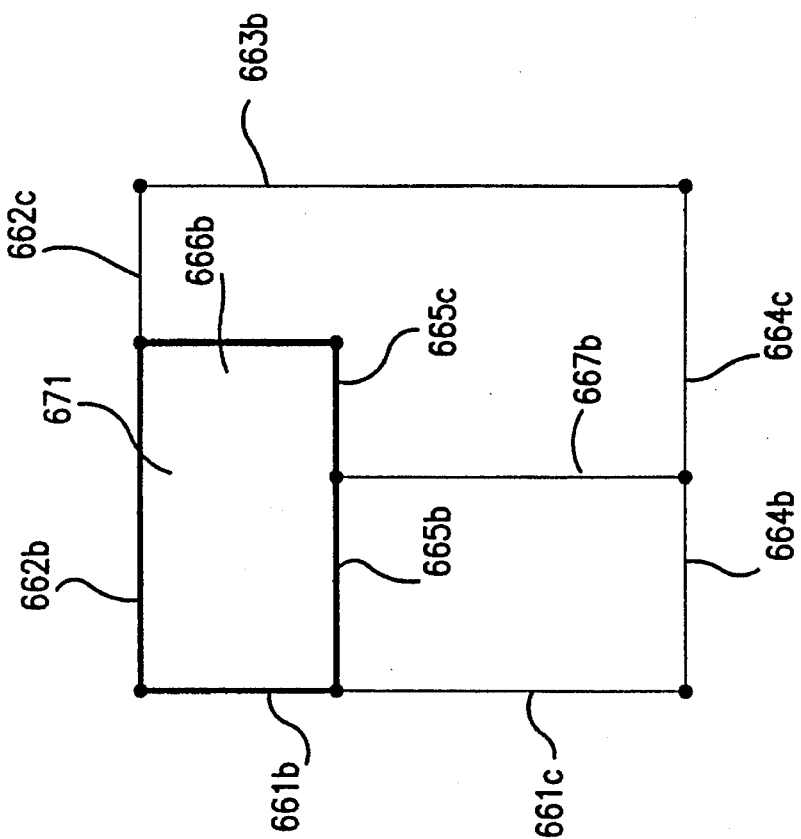
FIG. 47 shows the document image of FIG. 44 after a first closed loop is completed.

Next, in step S1140, the next loop segment is checked to see if it is the first loop segment, If not, control continues to step S1150, where the next loop segment is selected as a current loop segment and the next intersection point is selected as the last intersection point. This process is shown in FIG. 47 where the segment 662b, 666b, 665c, 665b, and 661b form an interloop enclosing the first document element 671. The fields corresponding to the tracked directions in each segment are marked.

If, in step S1140, the next segment is the first segment, control jumps to step S1160 where the current closed loop is treated as completed and the interior of the current closed loop is identified as the next document element. Control then continues to step S1170, which returns control to step S1200.

Figure 49:
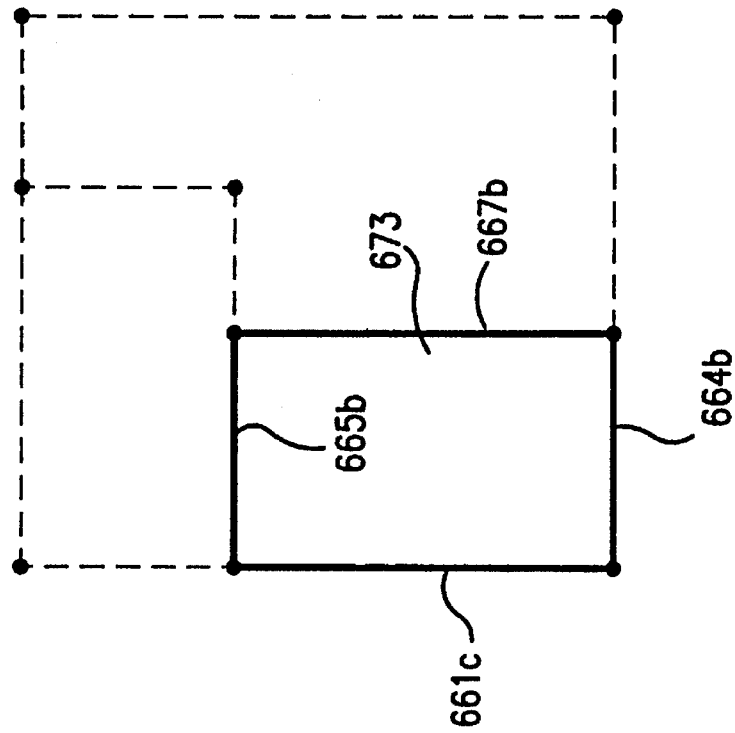
FIG. 49 shows the document image of FIG. 44 with a third and final closed loop completed.
Figure 48:
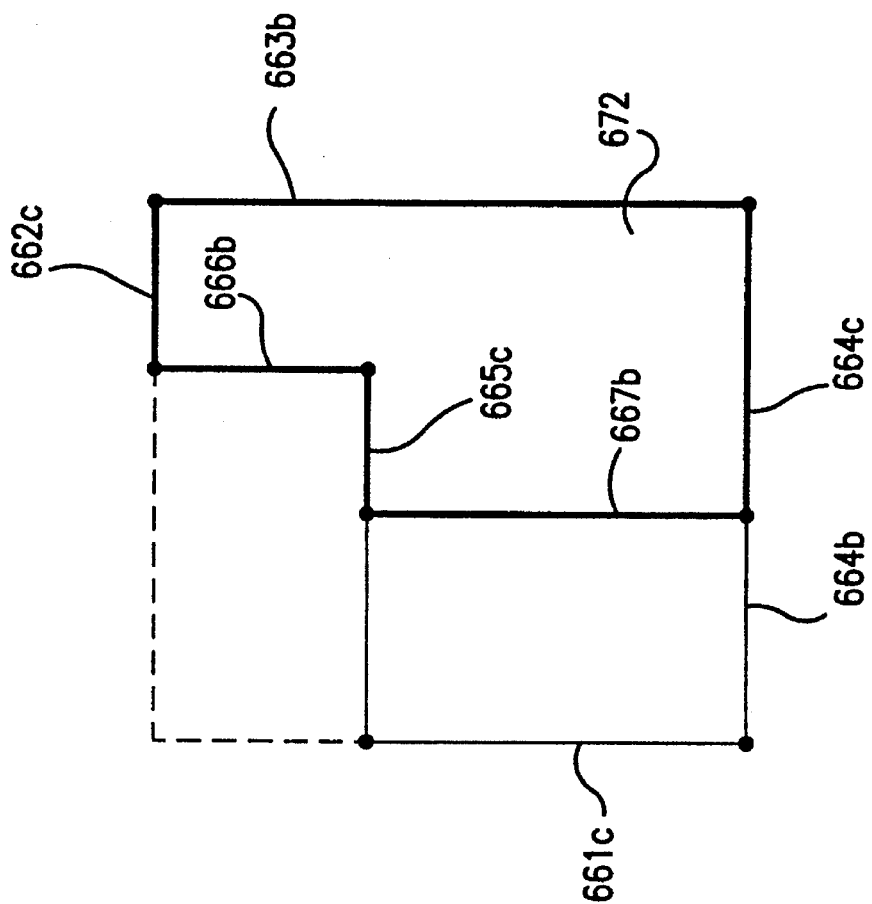
FIG. 48 shows the document image of FIG. 44 with a second closed loop completed.

FIGS. 48 and 49 show the process for identifying the second and third document element 672 and 673. As shown in FIG. 48, once the first document element 671 was located, the segments 661b and 662b. These segments are removed, as described above with respect to step S1200, because in finding the outermost loop, both fields of each of these segments have been marked. It should also be appreciated that if the closed loop is traced out in the counterclockwise direction, the line from the next intersection point would be rotated clockwise.

As many different embodiments of this invention may be made without departing from the spirit and scope thereof, it is to be understood that the invention is not limited to the specific embodiments thereof except as defined in the appended claims.

What is claimed is:

1. A method for extracting document elements from a document image, comprising the steps of:

identifying at least one connected component in the document image;

generating a minimum bounding box for each at least one connected component in the document image;

identifying primitive background areas surrounding the at least one bounding box for the at least one connected component;

selectively eliminating the primitive background areas such that each remaining primitive background area exceeds a minimum threshold;

selectively combining the remaining primitive background areas in the document image which uniquely share a common edge to form major background regions;

determining at least one set of major background regions based on intersection points between the major background regions;

segmenting the document image into document elements based on the at least one set of determined major background regions; and extracting the document elements segmented by the at least one set of determined major background regions.

2. The method of claim 1, wherein the step of forming major background regions comprises the steps of:

forming major background regions whose longitudinal axes are parallel to a first axis, said first axis comprising one of a horizontal axis and a vertical axis; and forming major background regions whose longitudinal axes are parallel to a second axis, said second axis orthogonal to said first axis and comprising another of the horizontal axis and the vertical axis.

3. The method of claim 1, wherein the step of selectively eliminating the primitive background regions comprises the steps of:

extracting the identified primitive background areas;

comparing a width of each of the primitive background areas to a width threshold value; and eliminating each of the primitive background areas having a width smaller than the width threshold value.

4. The method of claim 3, wherein the step of extracting primitive background areas includes the steps of:

forming a gap list;

forming a primitive background area list;

locating a top, a bottom, a leftmost side, and a rightmost side for the document image;

locating a first scanline as a current scanline at the top of the document image;

scanning the document image along the current scanline;

locating top edges of bounding boxes appearing in the current scanline;

establishing new primitive background areas and new primitive background gaps based on the located top edges of the appearing bounding boxes;

locating bottom edges of bounding boxes appearing in the current scanline;

establishing new primitive background areas and new primitive background gaps based on the located bottom edges of the appearing bounding boxes;

selecting a next scanline below the current scanline in the document image as the current scanline; and repeating the scanning through selecting steps for each scanline of the document image until the current scanline is a last scanline of the document image;

locating bottom positions for primitive background gaps on the gap list at the bottom of the document image;

removing the primitive background gaps which have established bottoms from the gap list; and adding new primitive background areas to the primitive background area list corresponding to the removed primitive white gaps.

5. The method of claim 4, wherein the step of establishing new primitive background areas and new primitive background gaps based on the located top edges of the bounding boxes comprises the steps of:

identifying primitive background gaps which touch the located top edges;

locating bottom positions for the primitive background gaps which touch a located top edge at a position corresponding to the located top edge;

removing the primitive background gaps which have established bottoms from the gap list;

adding new primitive background areas to the primitive background area list corresponding to the removed primitive background gaps;

establishing new primitive background gaps, each new primitive background gap having a top position at the located top edge, and a leftmost portion and a rightmost position located at sides of bounding boxes touching the new primitive background gap; and adding the new primitive background gaps to the gap list.

6. The method of claim 4, wherein the step of establishing new primitive background areas and new primitive background gaps based on the located bottom edges of the bounding box comprises the steps of:

identifying primitive background gaps which touch sides of the bounding boxes whose bottom edge has been located;

locating a bottom position for the primitive background gaps which touch the sides of a bounding box whose bottom edge has been located, at the bottom edge of the bounding box;

removing primitive background gaps which have established bottoms from the gap list;

listing new primitive background areas on the primitive background area list corresponding to the removed primitive background gaps;

establishing new primitive background gaps, each new primitive background gap having a top portion located at the located bottom edge of the bounding box, and a leftmost portion and a rightmost portion located at sides of bounding boxes touching the new primitive background gaps; and adding the new primitive background gaps to the gap list.

7. The method of claim 1, wherein the step of selectively combining the remaining primitive background areas comprises the steps of:

examining each of the plurality of primitive background areas, starting with primitive background areas located at the top of the document image and progressing to the bottom of the document image;

labeling each one of the plurality of primitive background areas;

assembling groups of primitive background areas, the groups of primitive background areas comprising primitive background areas having a common label;

comparing a height of each group of primitive background areas to a height threshold;

removing too-small groups of primitive background areas which have a height smaller than the height threshold and touch no other group;

removing branched groups of primitive background areas which have a height smaller than the height threshold and touch other groups only on one of a bottom of the branched group and a top of the branched group;

examining the groups of primitive background areas remaining after the too-small and branched groups removing steps to combine some of the remaining groups into a single group;

trimming short ends of selected primitive background areas in each one of the remaining groups;

merging primitive background areas, within each group of primitive background areas, which touch and have common left and right edges, into one primitive background area;

re-examining each of the removed primitive background area of those groups whose height is smaller than the height threshold;

merging re-examined removed primitive background areas into other primitive background areas;

comparing the height of each primitive background area to the height threshold; and identifying primitive background areas which have a height greater than the height threshold as major background regions.

8. The method of claim 7, wherein the step of labeling each one of the primitive background areas comprises the steps of:

selecting a first primitive background area as the current primitive background area;

determining if the current primitive background area has already been labeled;

determining, when the current primitive background area is not labeled, if exactly one other primitive background area touches a top edge of the current primitive background area;

labeling the current primitive background area with a same label as the single primitive background area touching the top edge of the current primitive background area;

labeling the current primitive background area with a new label when other than exactly one other primitive background area touches the top edge of the current primitive background area;

determining if a plurality of primitive background areas touch a bottom edge of the current primitive background area;

labeling each one of the plurality of primitive background areas touching the bottom edge of the current primitive background area with a new label;

determining if any unlabeled primitive background areas remain;

selecting a next unlabeled primitive background area as the current primitive background area; and repeating the exactly one touching area determining step through the remaining unlabeled areas determining step until no unlabeled primitive background areas remain.

9. The method of claim 7, wherein the step of examining groups of primitive background areas for regrouping comprises the steps of:

selecting a first labeled group as a current group;

determining if a single group touches a bottom edge of the current group;

determining if only the current group touches a top edge of the single group touching the bottom edge of the current group;

assigning, if a single group touches the bottom edge of the current group and only the current group touches the top edge of the single group, the label of the current group to the single group;

determining if any group has not been examined; and repeating all of the steps until all of the groups have been examined.

10. The method of claim 7, wherein the trimming step comprises the steps of:

selecting a first group as the current group;

locating a leftmost side of the primitive background areas in the current group as the current leftmost side;

comparing a height of the current leftmost side of the primitive background areas to the height threshold;

determining if the current leftmost side height exceeds the height threshold;

selecting a next leftmost side as the current leftmost side;

repeating the comparing, determining and selecting steps until the height threshold is exceeded by the height of the current leftmost side;

removing ends of primitive background areas in the current group extending to the left of the next leftmost side which has a height greater than the height threshold;

identifying a rightmost side of primitive background areas in the current group as the current rightmost side;

comparing a height of the current rightmost side of the primitive background areas to the height threshold;

determining if the current rightmost side height exceeds the height threshold;

selecting a next rightmost side as the current rightmost side;

repeating the comparing, determining and selecting steps until the height threshold is exceeded by the height of the current rightmost side;

removing ends of primitive background areas extending to the right of the current rightmost side which has a height greater than the height threshold;

selecting a next group as the current group; and repeating the leftmost side comparing step through the next group selecting step until no untrimmed groups remain.

11. The method of claim 7, wherein the merging step comprises the steps of:

selecting a first primitive background area as a current background area;

determining if a height threshold of the current primitive background area is less than a predetermined height threshold;

forming a list of primitive background areas which touch the current background area when the height threshold of the current primitive background area is less than the predetermined height threshold;

locating each pair of the touching primitive background areas on the list which touch a common portion of the current background area;

determining, for each such pair of two touching primitive background areas, if right and left edges of the pair of touching primitive background areas are sufficiently aligned;

removing each such pair of sufficiently aligned areas from the list of touching areas;

merging, for each such pair of sufficiently aligned touching areas, the pair of touching areas and the common portion of the current area into a combined area;

locating a widest one of the touching areas remaining on the list;

removing the widest area from the list of touching areas;

merging a touched portion of the current background area into the widest area;

removing any other touching areas from the list of touching areas which also touch the touched portion of the current background area;

repeating the widest area locating step through the any other touching area removing step until no areas remain on the list of touching areas;

selecting a next primitive background area as the current background area; and repeating the height threshold determining step through selecting a next primitive background area step until no additional primitive background areas need to be compared to the height threshold.

12. The method of claim 1, wherein the step of determining at least one set of major background regions comprises the steps of:

locating intersection points where two major background regions intersect;

removing major background regions which do not form closed loops of major background regions;

dividing remaining ones of the major background regions into segments, each segment bounded by a pair of the located intersection points;

forming a list of segments;

selecting a first segment from the list of segments as a current segment;

generating a closed loop of intersecting segments, the closed loop including the current segment;

revising the list of segments;

outputting a portion of the document image enclosed by the closed loop as a current document element;

determining if any segments remain on the list of segments;

selecting a next segment from the list of segments as the current segment if the list of segments is not empty; and repeating the generating through next segment selecting steps until the list of segments is empty.

13. The method of claim 12, wherein the removing step comprises the steps of:

locating any major background regions which intersect at most one other major background region;

removing the located major background regions;

determining if any major background regions which intersect at most one other major background region remain; and repeating the locating, removing and determining steps until no major background regions intersecting less than two other major background regions remain.

14. The method of claim 12, wherein the dividing step comprises the steps of:

selecting a first major background region as a current region;

locating intersection points where other major background regions intersect the current region;

dividing the current region at each intersection point;

removing segments of the current region bounded by only one intersection point;

determining if any undivided major background region remains;

selecting a next undivided major background region as the current region; and repeating the locating through the next undivided major background region selecting step until no undivided major background regions remain.

15. The method of claim 12, wherein the closed loop generating step comprises the steps of:

selecting a first intersection point of the current segment as a current intersection point;

moving from the current intersection point to a next intersection point of the current segment in a first one of a clockwise direction and a counterclockwise direction;

circling about the next intersection point in a second one of the clockwise direction and the counterclockwise direction until a next segment is located, wherein the second direction is opposite to the first direction;

determining if the next segment is the first segment;

selecting the next segment as the current segment and the next intersection point as the current intersection point if the next segment is not the first segment; and repeating the moving step through the next segment selecting step until the next segment is the first segment.

16. An apparatus for segmenting a document image into at least one document element, the document image represented by a plurality of pixels, the plurality of pixels represented by portions of an image signal, the apparatus comprising:

input means for inputting the image signal;

memory means for storing the image signal;

connected component identifying means for identifying at least one connected component from the plurality of pixels forming the document image;

bounding box generating means for generating a minimum bounding box around each one of the at least one connected component;

background area identifying means for identifying background areas surrounding the at least one bounding box for the at least one connected component;

background area eliminating means for selectively eliminating background areas such that each remaining background area exceeds a minimum threshold;

major background region extraction means for selectively combining the remaining background areas of the document image which uniquely share a common edge to form major background regions;

determining means for determining at least one set of major background regions that segment the document image into at least one document element based on intersection points between the major background regions;

document element extraction means for extracting the at least one document element segmented by the at least one set of determined major background regions; and control means for controlling the input means, the memory means, the connected component identifying means, the bounding box generating means, the background area identifying means, the background area eliminating means, the major background region extraction means, the determining means and the document element extraction means.

17. The apparatus of claim 16, wherein the major background region extraction means comprises a vertical extraction section and a horizontal extraction section.

18. The apparatus of claim 17, wherein the vertical and horizontal extraction sections each comprise:

primitive background area extraction means;

comparison means for comparing dimensions of the primitive background areas against predetermined dimension thresholds;

elimination means for eliminating primitive background regions based on an output of the comparison means; and grouping means for grouping and merging remaining primitive background areas.

* * * * *